(12) United States Patent
Lissy

(10) Patent No.: US 8,449,215 B2
(45) Date of Patent: May 28, 2013

(54) HUB-SHAFT ASSEMBLY

(75) Inventor: Igor Lissy, Glen Mills, PA (US)

(73) Assignee: Alphatech, LLC, Glen Mills, PA (US)

( * ) Notice: Subject to any disclaimer, the term of this patent is extended or adjusted under 35 U.S.C. 154(b) by 0 days.

(21) Appl. No.: 13/610,554

(22) Filed: Sep. 11, 2012

(65) Prior Publication Data

US 2013/0004236 A1    Jan. 3, 2013

Related U.S. Application Data

(63) Continuation of application No. 13/277,741, filed on Oct. 20, 2011, now abandoned.

(60) Provisional application No. 61/406,408, filed on Oct. 25, 2010.

(51) Int. Cl.
*F16H 3/08*    (2006.01)

(52) U.S. Cl.
USPC .................................. 403/1; 403/356; 74/331

(58) Field of Classification Search
USPC ..................... 403/1, 355, 356, 408.1; 74/434, 74/445, 412 R
See application file for complete search history.

(56) References Cited

U.S. PATENT DOCUMENTS

| | | | |
|---|---|---|---|
| 892,932 A | 7/1908 | Buettner et al. | |
| 1,392,915 A | 10/1921 | Clendenon | |
| 2,452,458 A | 10/1948 | Hahn | |
| 2,689,483 A | 9/1954 | Senna | |
| 2,754,920 A | 7/1956 | Derry | |
| 2,855,228 A | 10/1958 | Kreissig et al. | |
| 2,887,891 A * | 5/1959 | Perez | 474/171 |
| 3,487,903 A | 1/1970 | Stickan | |
| 4,104,928 A * | 8/1978 | Vandervoort | 74/331 |
| 4,423,643 A * | 1/1984 | McNamara | 74/331 |
| 4,512,694 A | 4/1985 | Foran et al. | |
| 5,483,847 A * | 1/1996 | Reynolds | 74/331 |
| 6,106,187 A | 8/2000 | Mina | |
| 2012/0099926 A1 | 4/2012 | Lissy | |

OTHER PUBLICATIONS

Article by kkaarthic, BRIGHT HUB (online), Types and Designs of Shaft Keys, publishd Aug. 27, 2009, pp. 3.
Calistrat, Michael M., "Shaft keys revisited", Power Transmission Design, May 1995, pp. 105-107.
Feather Keys: The forgotten and ignored drive component, White Paper, Copyright 2009 by Rino Mechanical, pp. 11.
French, Thomas E., et al., "A Manual of Engineering Drawing for Students and Draftsman", McGraw-Hill Book Company, Inc., Eighth Edition, 1953, pp. 426-428.
Korane, Kenneth J., "Shaft Keys that Reduce Manufacturing Costs and Machine Downtime", Published on Machine Design (http://machinedesign.com), Created Sep. 2, 2009, pp. 1-5.
Motion Control Technology (online), "Alternatives to Keyways in Motion Systems", Nov. 18, 2009, pp. 1-4.
R+W Coupling Technology (online), Technical articles: The Obsolescence of keyways in Servo Motion System, Nov. 18, 2009, pp. 1-2.

* cited by examiner

*Primary Examiner* — Joshua Kennedy
(74) *Attorney, Agent, or Firm* — Lando & Anastasi, LLP

(57) ABSTRACT

A hub and shaft assembly includes a shaft having a portion with an enlarged diameter outer surface, a hub having an inner surface configured to engage the outer surface of the shaft, and a first fastening device positioned within a first opening formed in the engaged outer surface of the shaft and the inner surface of the hub along lengths of the shaft and the hub.

4 Claims, 10 Drawing Sheets

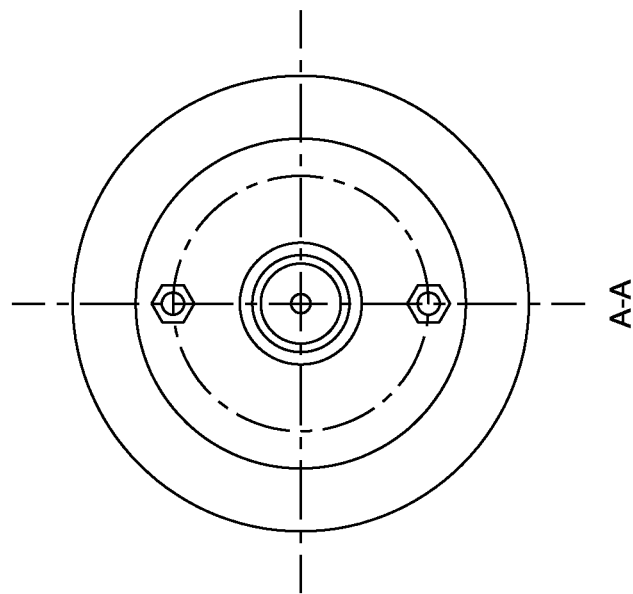
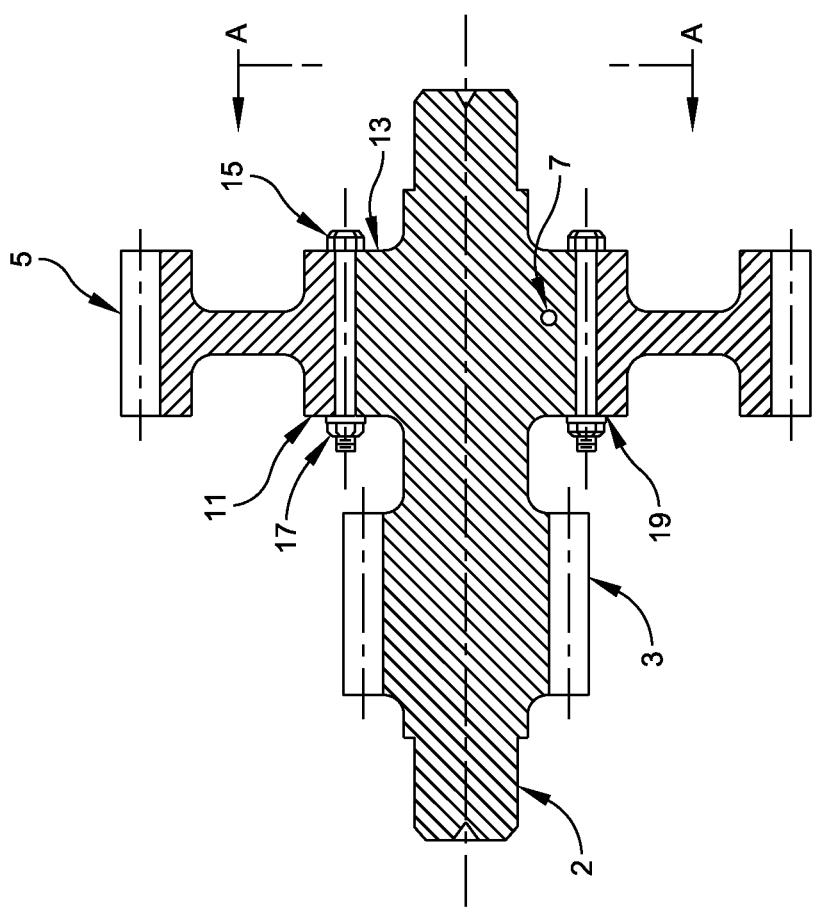

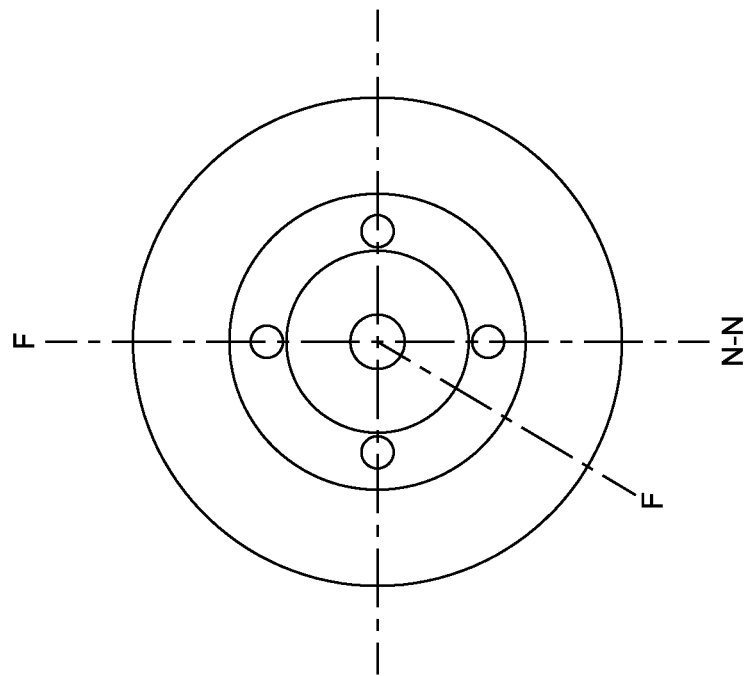
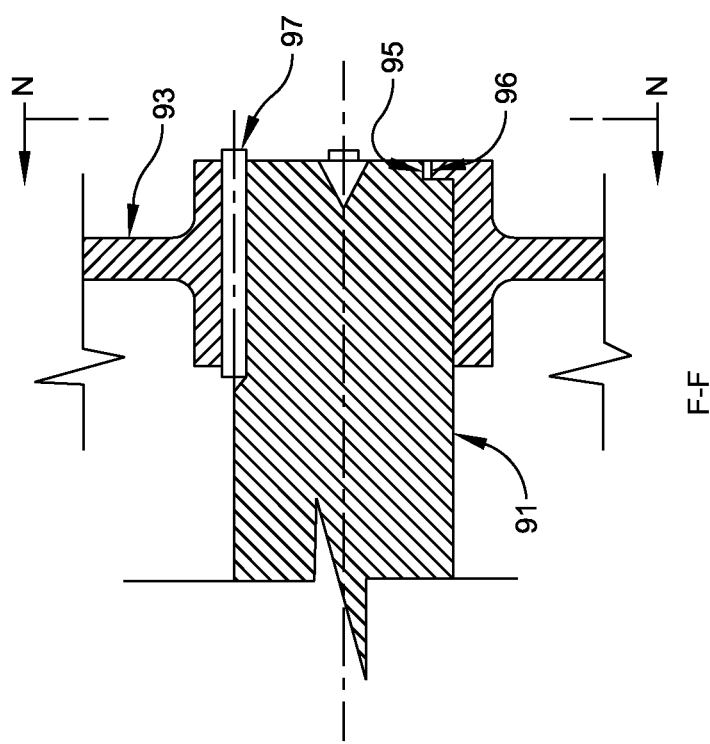
FIG. 9A
FIG. 9B

HUB-SHAFT ASSEMBLY

CROSS-REFERENCE TO RELATED APPLICATION

This patent application is a Continuation patent application of U.S. Ser. No. 13/277,741, entitled "HUB-SHAFT ASSEMBLY," filed on Oct. 20, 2011, which claims priority under 35 U.S.C. §119(e) to U.S. Provisional Patent Application Ser. No. 61/406,408, entitled "HUB-SHAFT ASSEMBLY," filed on Oct. 25, 2010, which are both hereby incorporated herein by reference in their entirety.

BACKGROUND OF THE DISCLOSURE

1. Field of Invention

At least one embodiment of the present invention relates generally to an assembly and method for securing a hub to a shaft, and more specifically, to a hub-shaft assembly incorporating axially aligned fastening devices to secure the hub to the shaft.

2. Discussion of Related Art

A common method for locking hubs of various mechanical components (e.g., gears, brake wheels, sprocket wheels, shaft couplings, cranks, cams, etc.) to shafts for the purpose of transmitting torque or rotary motion is by use of a key installed between the shaft and hub. The key cross section is generally square or rectangular (e.g., parallel or tapered). These keys lock the hub to the shaft against relative rotational movement, but the relative axial movement is restrained only by friction between the hub, shaft, and key. Positive restraint can be provided, but only in one direction, by an interlocking shoulder on the shaft or hub.

The recommended sizes and dimensional tolerances for parallel and tapered key assemblies, based on shaft diameter and class of fit, are tabulated in USA Standard USAS B17.1-1967, Keys and Keyseats.

These key installations have several inherent shortcomings:

Because the keyseat in the shaft and the keyway in the hub are machined independently of each other, the machining and indexing require a high degree of accuracy for a proper match with each other and with the key. The possible mismatches and/or misalignments, that degrade the fit (e.g., the desired and/or required bearing or amount of metal-to-metal contact) of the key installation and reliability of the hub-shaft connection, are also depicted in this standard. There is no reliable way of determining the extent of these mismatches and/or misalignments, and the resulting degradation of the torque-carrying capacity, after the installation. Poor bearing contact, such as on high spots or along edges, raises the localized bearing stresses and leads to surface deformations, loosening of key, and/or failure of the connection.

The 90-degree corners of the keyseat, even when filleted, cause stress concentrations that degrade the strength of the shaft. The above industry standard presents suggested fillet radii and the corresponding key chamfers "as a guide." According to the authoritative *Peterson's Stress Concentration Factors*, Second Edition, Chart 5.2, by Walter D. Pilkey, the stress concentration factors (stress increases due to this geometric discontinuity) for the suggested fillet radii vary between 2.4 and 2.8. But USAS B17.1-1967, Table 7 states: "In general practice, chamfered keys and filleted keyseats are not used. However, it is recognized that fillets in keyseats decrease stress concentrations in corners. When used, fillet radii should be as large as possible without causing excessive bearing stresses due to reduced contact area between the key and its mating parts." In practice, it is customary to specify a 0.005-inch radius for the corner fillets. For this fillet radius, the stress concentration factor (stress increase due to this geometric discontinuity) is 4.00 according to *Peterson's Stress Concentration Factors*.

The stress concentrations in the keyseat (and keyway) corners can become sites for initiation of fatigue stress cracks. Metal fatigue is the progressive (often initiated at a point of stress concentration) structural damage that occurs when a material is subjected to cyclic loading. The actual stresses are below the ultimate tensile stress limit, and may be less than the yield stress limit of the material.

American National Standard ANSI/AGMA 6001-D97, Design and Selection of Components for Enclosed Gear Drives, is the authoritative industry standard for the design of gearbox shafts (and other gearbox components). It provides graphic and quantitative analyses of the various features and conditions that degrade the fatigue strength of shafts. Although this standard was developed specifically for the enclosed gear drives, its shaft design methodology is applicable to the design of shafts in general.

In some key installations, a single key is not adequate for the torque to be transmitted. It is therefore necessary to install a second key. Frequently, the amount of indexing error requires the second key to be a "hand-made stepped" key. See, e.g., FIG. 1, which shows the shape of a hand-made stepped key required in cases where the second keyseat and keyway are not indexed precisely from the first set. (The offset/step is shown exaggerated for clarity.) Furthermore, for solid metal-to-metal contact, radial and axial cant may be required on the side faces of the stepped key. (The top and bottom faces need not make contact with the hub or shaft.)

SUMMARY OF THE DISCLOSURE

In part because of the lack of positive axial hub-shaft retention (clamping) in both directions, the difficulty and complexity of matching separately machined keyseats and keyways, deleterious effect of keyseat and keyway corners, and/or impracticability of ascertaining the fit (e.g., degree of metal-to-metal contact) of the key installation after the components are pressed-on, alternative methods of securing hubs on shafts were devised. Such methods can be used, for example, to prepare hub and shaft assemblies for rotary motion, for torque transmission in power trains, for precise indexing of paired or adjacent components (e.g., helical gears and cams), for ease of machining, and/or for improved certainty in obtaining a solid metal-to-metal fit (e.g., contact over all the surfaces, e.g., not just on isolated points (e.g., high points or corners) on a surface)).

One aspect of the present disclosure is directed to an assembly comprising a shaft including an outer surface, a hub including an inner surface configured to engage the outer surface of the shaft, and a first fastening device positioned within a first opening formed in the engaged outer surface of the shaft and the inner surface of the hub along lengths of the shaft and the hub.

Embodiments of the assembly may further include providing the shaft with an enlarged shaft portion having the outer surface. The hub may include a helical gear. In one embodiment, the helical gear is pressed-on with a light interference fit onto the enlarged shaft portion of the shaft. In another embodiment, ends of the enlarged shaft portion and ends of the hub are turned/dressed concurrently to present a common flat plane/surface on each side.

The assembly may further comprise a second fastening device positioned within a second opening formed in the engaged outer surface of the shaft and the inner surface of the hub along lengths of the shaft and the hub. In one embodiment, the first opening and the second opening are drilled and reamed. In another embodiment, the first fastening device and the second fastening device include bolts having diameters selected for a desired transmitted torque capacity based on their material strength and the strength of the shaft and hub. In another embodiment, the first fastening device and the second fastening device include dowel pins having diameters selected for a desired transmitted torque capacity based on their material strength and the strength of the shaft and the hub. In another embodiment, the dowel pins and the hub are retained against axial movement with an overlapping washer and a retaining ring. In another embodiment, a depth of the openings is greater than a length of the hub and the dowel pins are installed so that their ends are visible at an end of the hub. In another embodiment, the first and second openings are formed in the shaft and the hub so that the dowel pins slant to prevent any axial movement of the hub on the shaft.

In one embodiment, the first fastening device includes a bolt, and a nut that is tightened over a washer. In another embodiment, the first opening is formed by a semi-cylindrical formation formed in the outer surface of the shaft and a mating semi-cylindrical formation formed in the inner surface of the hub. In another embodiment, the shaft includes a step and the hub includes a shoulder in contact with the step.

In one embodiment, the assembly further comprises a second hub having an inner surface configured to engage the outer surface of the shaft, and a second fastening device positioned within a second opening formed in the engaged outer surface of the shaft and the inner surface of the second hub along lengths of the shaft and the second hub. In one embodiment, the hub includes a lip on one end of the hub, the lip being configured to be seated against a square end of the shaft.

Another aspect of the disclosure is directed to a method of securing a hub to a shaft, the method comprising: positioning a hub having an inner surface to a shaft having an outer surface; forming an opening at an interface of the inner surface of the hub and the outer surface of the shaft; and inserting a fastening device in the opening.

Embodiments of the method may include machining the opening through the interface of the inner surface of the hub and the outer surface of the shaft. In one embodiment, the opening extends in a direction parallel to an axis of the shaft. In another embodiment, the opening extends in a direction at an acute angle to an axis of the shaft. In another embodiment, the opening is at a slant relative to the shaft axis and the slant is at an angle of about 5 to about 45 degrees relative to the shaft axis. In another embodiment, the shaft into which a portion of the opening is machined comprises an enlarged portion of the shaft. In another embodiment, the shaft into which a portion of the opening is machined includes a stepped terminus of the shaft. In another embodiment, the opening is machined to extend through about 10% to about 90% of a length of the interface of the inner surface of the hub and the outer surface of the shaft. In another embodiment, up to six openings are machined. In another embodiment, the fastening device includes a key. In another embodiment, the key includes a one of a cylindrical clamping key, a bolt, a stud, and a screw. In another embodiment, the key includes a cylindrical non-clamping key. In another embodiment, the cylindrical non-clamping key comprises a pin, a hollow cylinder, or a spring pin. In another embodiment, a face of a shoulder of an enlarged portion of the shaft includes an end of the opening, and wherein the opening is machined at an angle in which the face is normal to a longitudinal axis of the opening. In another embodiment, a shoulder of an enlarged portion of the shaft includes an end of the opening, and wherein the opening is machined at an angle with respect to an axis that is normal to the face.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by reference signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the disclosure. In the figures:

FIGS. 2A and 2B show a longitudinal cross section and partial end view of a bi-directional gearbox intermediate shaft with an integral pinion.

FIGS. 9A and 9B show partial longitudinal cross section and partial end view of an installation of a brake wheel, sprocket wheel, or other mechanical component on a shaft.

DETAILED DESCRIPTION OF THE PREFERRED EMBODIMENTS

Figure 1:
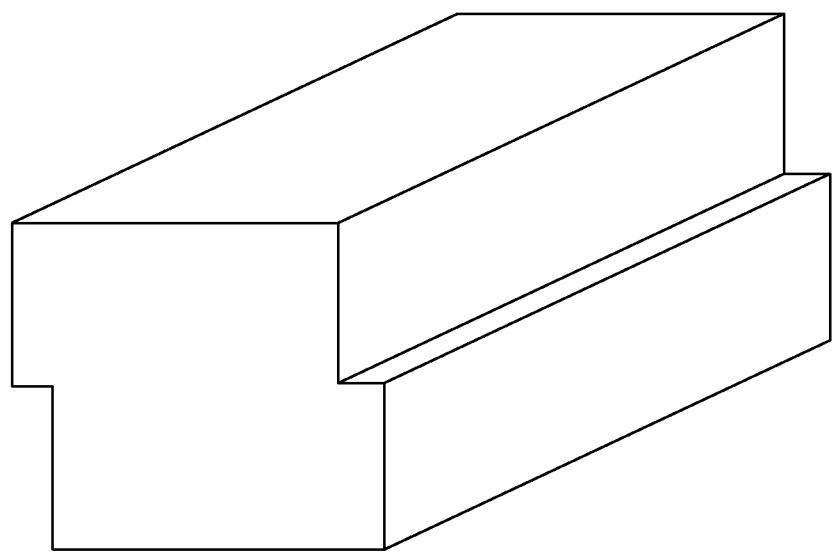
FIG. 1 shows the shape of a hand-made stepped key required in cases where a second keyseat and keyway are not indexed precisely from the first set.

Embodiments of the devices and methods discussed herein are not limited in application to the details of construction and the arrangement of components set forth in the following description or illustrated in the accompanying drawings. The devices and methods are capable of implementation in other embodiments and of being practiced or of being carried out in various ways. Examples of specific implementations are provided herein for illustrative purposes only and are not intended to be limiting. In particular, acts, elements, and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to top and bottom, lateral, or upper and lower are intended for convenience of description, not to limit the present systems and methods or their components to any one positional or spatial orientation.

In lieu of the customary square or rectangular keys installed in individually-machined keyseats and keyways, a cylindrical clamping key, (e.g., in the form of a threaded fastener with a smooth shank), is installed in a hole drilled concurrently (e.g., jointly) (e.g., parallel to the shaft axis or at a slant relative to the shaft axis) through the interface of a shaft (e.g., an enlarged portion of a shaft, a stepped terminus of a shaft, or a shaft of uniform diameter) and a hub bore. For example, in the case of a gearbox intermediate shaft, the enlarged portion of the shaft need not be larger than that of an integral pinion (FIGS. 2A and 2B) (or what is often provided for a square key installation to compensate for the weakening due to the keyseat) to provide adequate clearance over an adjacent shaft diameter for the cylindrical clamping key head, nut, load-equalizing washer/saddle/rocker (when required), and a locking device. The shaft and hub are of comparable hardness and their faces are flush or spot-faced to provide a flat surface to start the drill and for solid seating of the cylindrical clamping key head or nut. The hub-shaft press fit holds the components in position for the machining operations. After drilling, the hole is reamed to a close tolerance for a slight interference fit with the clamping key. USA Standard USAS B4.1-1967, Preferred Limits and Fits for Cylindrical Parts, tabulates the dimensional tolerance ranges for various classes of fits. The semi-circular contours of the "keyseat" and "keyway"—in effect the largest possible fillet radii—cause lesser local stresses than those of the 90-degree keyseat and keyway, and thereby forestall the initiation of fatigue stress cracks. For example, the stress concentration factor is 2.0 (extrapolated from Chart 5.2 of *Peterson's Stress Concentration Factors*) as compared to values of 2.4, 2.8, or 4.0.

When required (e.g., for increased torque capacity or balance) the number of cylindrical clamping keys can be increased until the connection resembles a spline. For example, 2, 3, 4 or more cylindrical clamping keys can be used.

Two possible methods of hub-to-shaft clamping are shown in FIGS. 2A and 2B, FIGS. 3A and 3B, and FIGS. 4A and 4B.

FIGS. 2A and 2B show a longitudinal cross section and partial end view of a typical bi-directional gearbox intermediate shaft with an integral pinion. The gear is locked to the shaft with cylindrical clamping keys. The ends (faces) of the hub and the shaft shoulders are machined (turned/dressed) together after the gear is pressed onto the shaft. Alternatively, the ends of the hub and shaft can be spot-faced at their interface for the drill locations/sites and seats for the clamping components. The helical gear can carry axial loads in either direction.

Figure 3B:
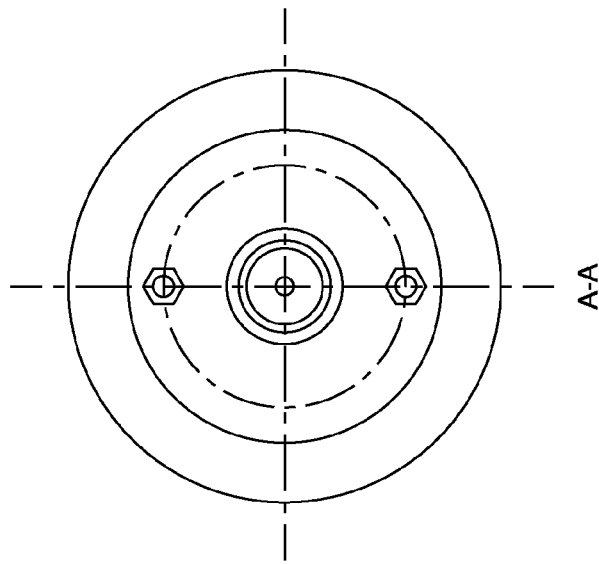
FIGS. 3A and 3B show a longitudinal cross section and partial end view of a hub installation for a heavy axial load-carrying capacity in one direction, such as with a helical gear of a hoist gearbox.
Figure 3A:
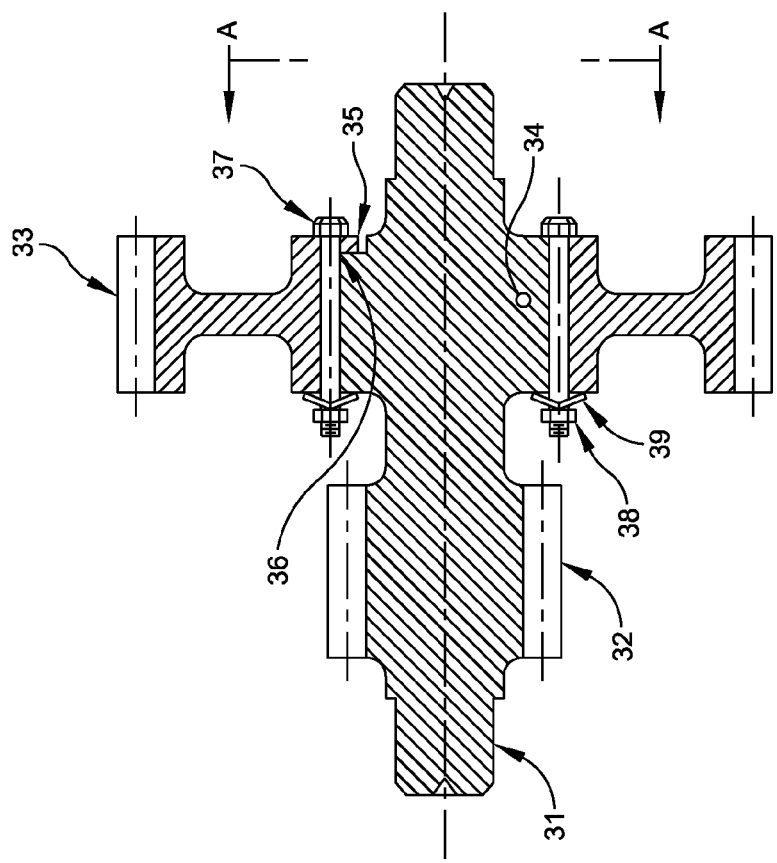

FIGS. 3A and 3B show a longitudinal cross section and partial end view of a hub installation for a heavy axial load-carrying capacity in one direction, such as with a helical gear of a hoist gearbox. The square "V-washers" or other load-equalizing components compensate for the hub face and shaft shoulder surfaces that are turned/dressed separately for being out of a common plane.

Figure 4B:
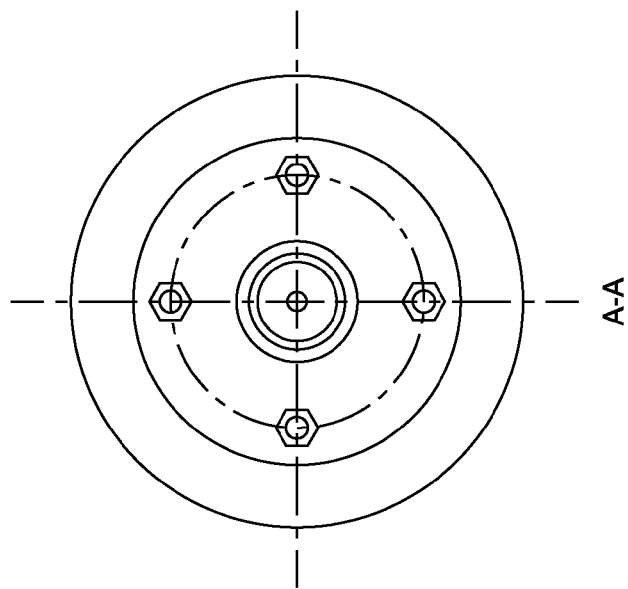
FIGS. 4A and 4B show a longitudinal cross section and partial end view of paired opposite-hand helical gears intended to mesh with a herringbone pinion.
Figure 4A:
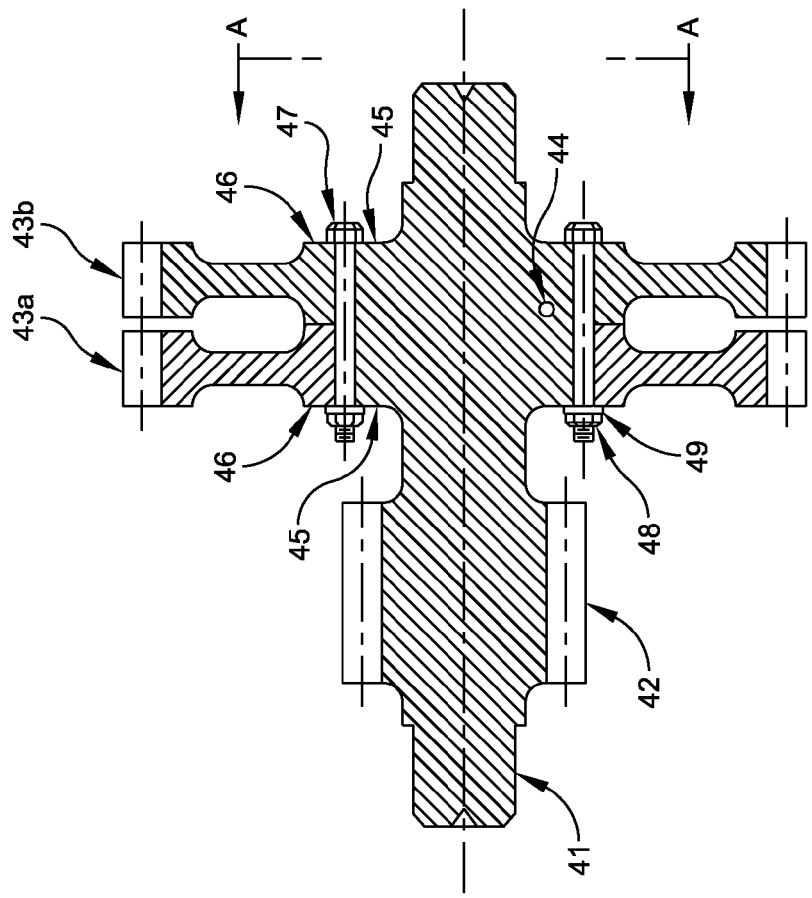

FIGS. 4A and 4B show a longitudinal cross section and partial end view of paired opposite-hand helical gears intended to mesh with a herringbone pinion. The holes for the cylindrical clamping keys are drilled and reamed after the two helical gears are indexed with respect to each other to equally share the tangential load from the herringbone pinion. The ends (faces) of the hubs and shaft shoulders are machined (turned/dressed) together after the gears are pressed onto the shaft. Alternatively, the outer ends of the hubs and the ends of the shaft can be spot-faced at their interface for the drill locations/sites and seats for the clamping components.

In similar fashion, two (or more) cams can be precisely indexed to each other and then locked in position with cylindrical clamping keys.

When direct hub-to-shaft clamping is not required (for example, when there is no axial load applied to the hub, when the cylindrical key axial movement is limited/restrained by adjacent components, or when it is impractical to incorporate the clamping feature and the position of the key can be readily checked), the cylindrical key can be installed as shown in FIGS. 5A and 5B, FIGS. 6A and 6B, FIGS. 7A and 7B, FIGS. 8A and 8B, or FIGS. 9A and 9B.

Figure 5B:
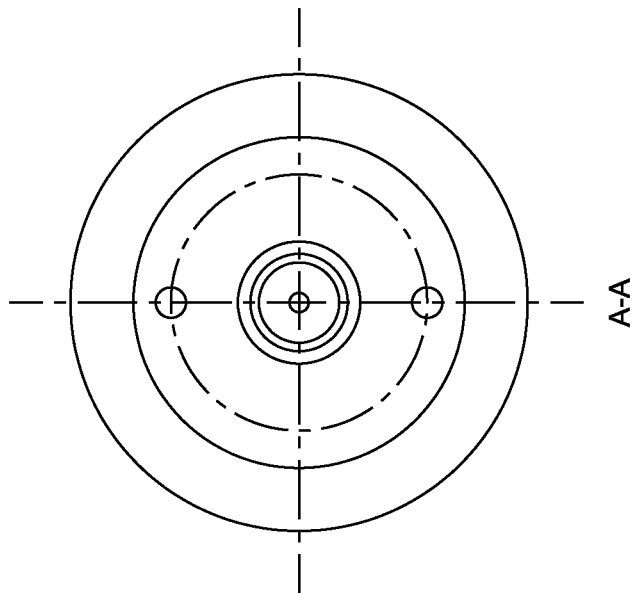
FIGS. 5A and 5B show a longitudinal cross section and partial end view of a gearbox shaft with an integral pinion and a spur gear.
Figure 5A:
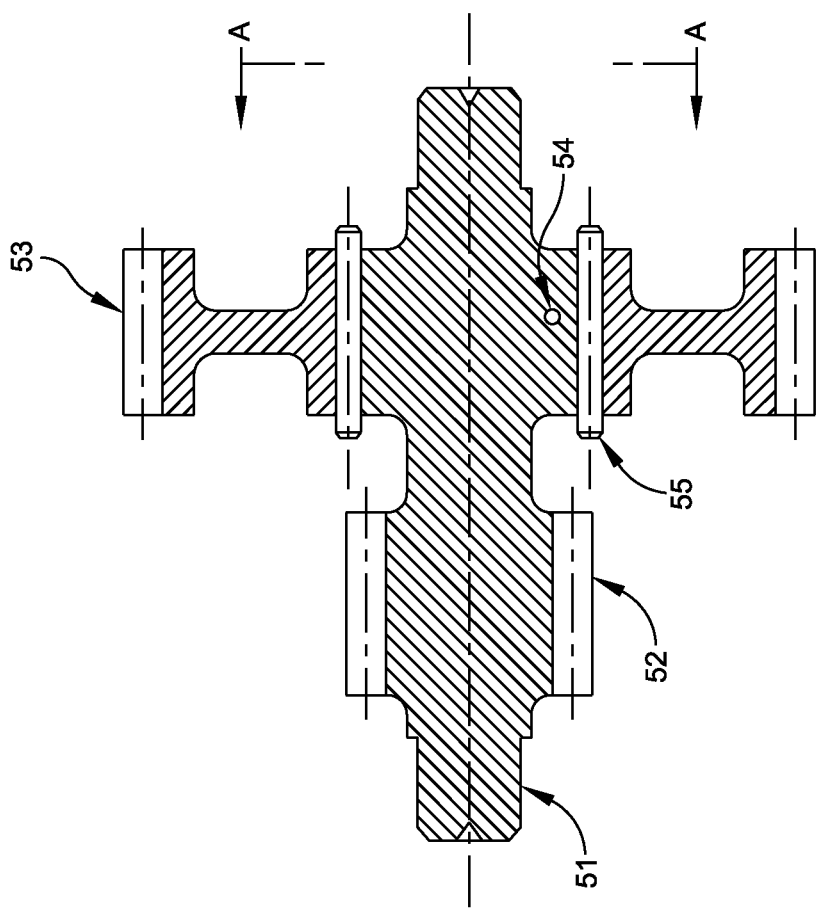

FIGS. 5A and 5B show a longitudinal cross section and partial end view of a gearbox shaft with an integral pinion. The gear is spur type (developing no axial force) so that no end restraint (clamping) on either end is required. The benefits of the semi-circular keyseat and keyway are still retained.

Figure 6B:
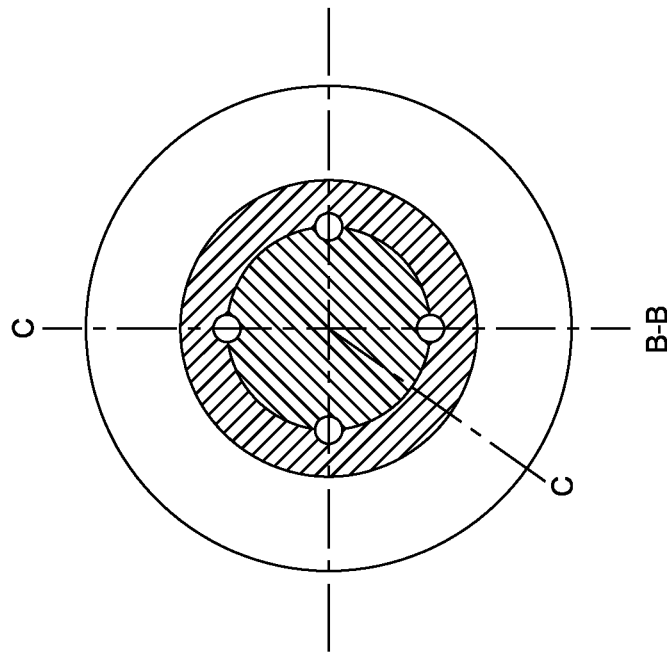
FIGS. 6A and 6B show partial longitudinal and partial transverse cross sections of an installation of a brake wheel, sprocket wheel, or other component on a shaft using cylindrical keys with a washer and a retaining (snap) ring.
Figure 6A:
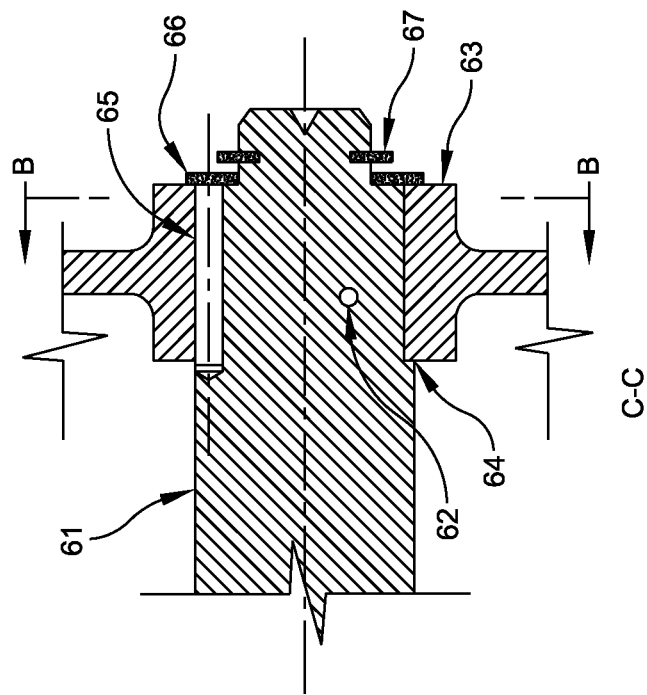

FIGS. 6A and 6B show partial longitudinal and partial transverse cross sections of an installation of a brake wheel, sprocket wheel, or other component on a shaft using cylindrical keys with a washer and a retaining (e.g., snap) ring. Although no clamping is provided, and may not be necessary, the hub and cylindrical keys are restrained on both ends.

Figure 7B:
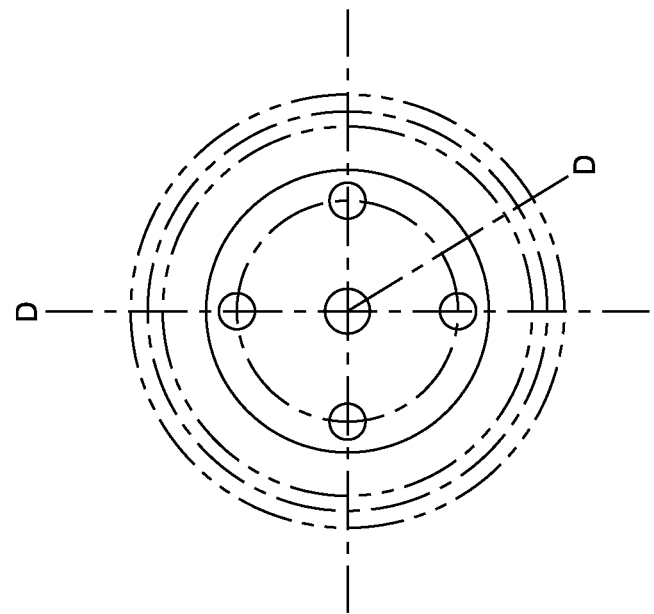
FIGS. 7A and 7B show partial longitudinal cross section and end views of an installation of a shaft coupling hub.
Figure 7A:
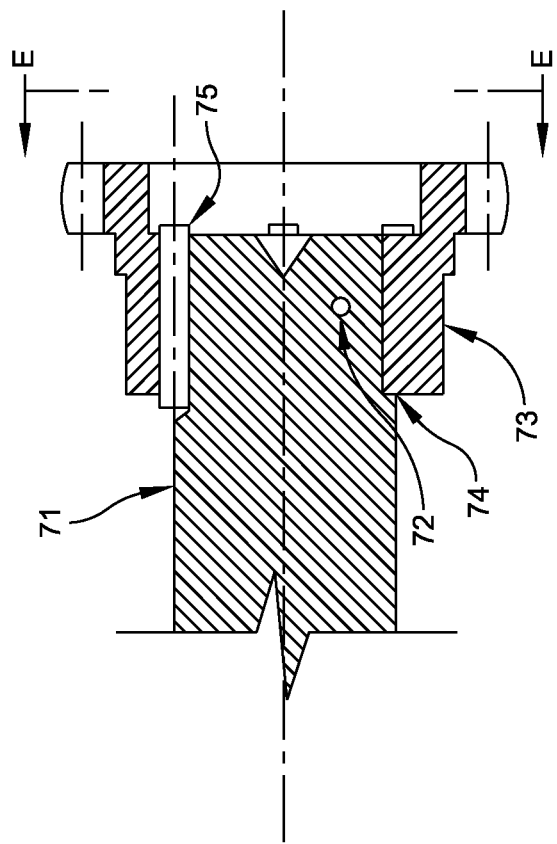

FIGS. 7A and 7B show partial longitudinal cross section and end view of an installation of a barrel type shaft coupling hub. There is no axial load from the crowned gear teeth so no axial restraint is required for the cylindrical keys and the hub. The hub and keys are restrained on one end, and a restraint can be easily provided on the other end with a large washer secured with a fastener threaded into the shaft end.

Figure 8B:
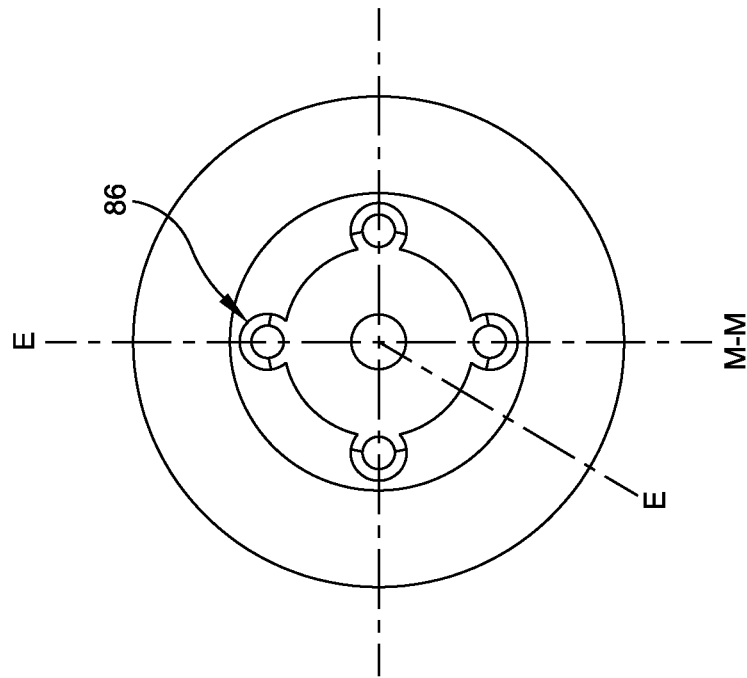
FIGS. 8A and 8B show partial longitudinal cross section and partial end view of an installation of a brake wheel, sprocket wheel, or other mechanical component on a shaft.
Figure 8A:
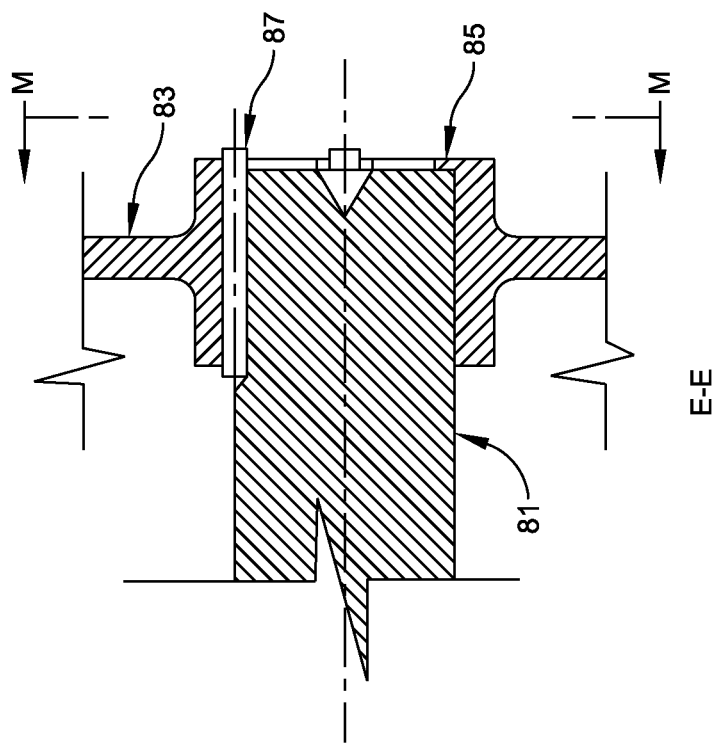

FIGS. 8A and 8B show partial longitudinal cross section and partial end view of an installation of a brake wheel, sprocket wheel, or other mechanical component on a shaft using cylindrical keys. Key hole locations are spot-faced to present a flat surface at the hub-shaft interface for machining the key holes. The hub and keys are restrained on one end only, and the hub bore lip allows the assembly to carry an axial load in one direction (into the shaft).

FIGS. 9A and 9B show partial longitudinal cross section and partial end view of an installation of a brake wheel, sprocket wheel, or other mechanical component using cylindrical keys. The hub and keys are restrained in one direction only, and the hub bore lip allows the assembly to carry an axial load in one direction (into the shaft).

Figure 10A:
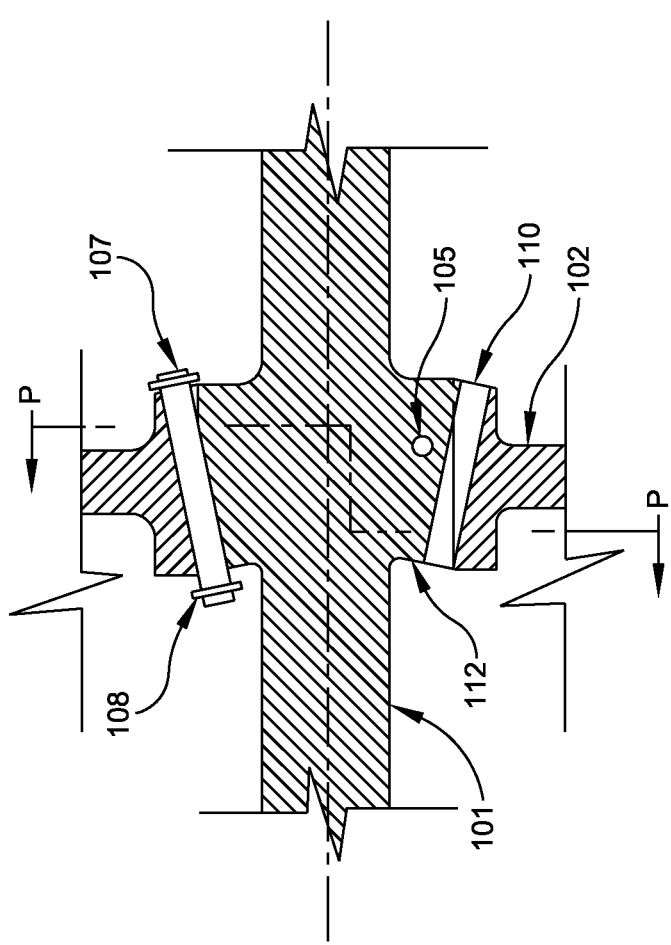
FIGS. 10A and 10B show a partial longitudinal cross section and a partial end view of a hub of mechanical components installed on a shaft.
Figure 10B:
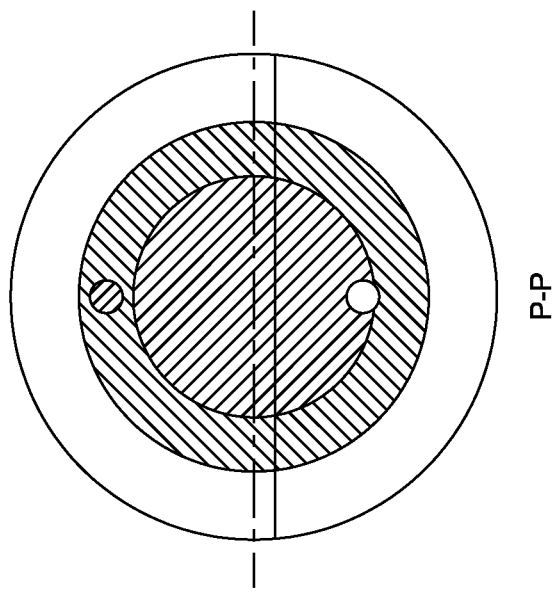

FIGS. 10A and 10B show a partial longitudinal cross section and a partial end view of a hub of a mechanical component installed on a shaft. The holes for the cylindrical keys are machined at a slant to the shaft axis, e.g., to provide clearance for the machining equipment or to lock the hub against axial movement. The faces of the shoulders of the shaft and hub may be spot-faced or machined (turned) at a slant complementary to the slant of the keys to present parallel surfaces normal to the axes of the cylindrical keys for contact with the retaining devices. The slant of the keys with respect to the shaft axis locks the hub against axial movements on the shaft.

Referring to FIGS. 2A and 2B, an intermediate stage of a gearbox (speed reducer) is comprised of a shaft 2 with an integral pinion 3 and an installed helical gear 5. Helical gear 5 is pressed-on with a light interference fit (LN or FN1 per USA Standard USAS B4.1-1967) onto the enlarged shaft portion 7 on shaft 2. Face surfaces 11 and 13 on helical gear 5 and enlarged shaft portion 7, respectively, are turned/dressed concurrently to present a common flat plane/surface on each side. Two openings or holes, 180 degrees apart, are drilled and reamed for bolts (cylindrical keys) 15 whose diameter is selected for the required torque capacity based on their material strength and the strength of the shaft and helical gear hub. The holes are drilled at the interface of the helical gear 5 and the shaft 2. The result is that each hole is formed by a semi-cylindrical formation formed in a surface of the helical gear 5 and a mating semi-cylindrical formation formed in a surface of the shaft 2. Bolt 15 fit tolerances are selected for a light interference fit, as for the helical gear and the shaft. Bolts 15 are installed and secured with nuts 17 and tightened over washers 19. Nuts 17 are locked against loosening on bolts 15 with one of the various locking devices.

Studs or shoulder screws may be used in lieu of the bolts.

The assembly is appropriate for uni-directional or bi-directional drives with either a spur or a helical gear. The axial load capacity is determined by the strength of nuts 17 and threaded portion of the bolts.

It is important to note that the enlarged portion 7 diameter of shaft 2 does not require a shaft forging or bar larger than is required for the integral pinion 3. Likewise, for the last (output) shaft of the speed reducer the enlarged shaft portion diameter would be no larger (or only slightly larger) than that required for the customary/traditional square key installation.

Referring to FIGS. 3A and 3B, an intermediate stage of a gearbox (speed reducer) is comprised of a shaft 31 with an integral pinion 32. Helical gear 33 is pressed-on with a light interference fit (LN or FN1 per USA Standard USAS B4.1-1967) onto the enlarged shaft portion 34 on shaft 31. The helical gear 33 has a shoulder 35 in contact with the step 36 on shaft 31. Two holes, 180 degrees apart, are drilled and reamed for bolts (cylindrical keys) 37 whose diameter is selected for the required torque capacity based on their material strength and the strength of the shaft and helical gear hub. Bolt 37 fit tolerances are selected for a light interference fit, as for the helical gear and the shaft. Bolts 37 are installed and secured with nuts 38 tightened over load-equalizing washers 39 that compensate for out-of-common-plane face surfaces of the enlarged shaft portion and the hub. Nuts 38 are locked against loosening on bolts 37 with one of the various locking devices.

Studs or shoulder screws may be used in lieu of the bolts.

The assembly is appropriate for uni-directional drives with either spur or helical gears and for bi-directional drive with spur gears. The maximum axial load capacity is determined by the strength of the hub shoulder in that direction and by the strength of the load-equalizing washers in that direction.

Referring to FIGS. 4A and 4B, an intermediate stage of a gearbox (speed reducer) is comprised of a shaft 41 with an integral pinion 42 and an installed pair of opposite hand helical gears 43a and 43b. The helical gears are pressed on with a light interference fit (LN or FN1 per USA Standard USAS B4.4-1967) onto the enlarged shaft portion 44 on shaft 41. Face surfaces 45 and 46 are turned/dressed concurrently to present a common flat plane/surface on each side. Four holes, 90 degrees apart, are drilled and reamed for bolts (cylindrical keys) 47 whose diameter is selected for the required torque capacity based on their material strength and the strength of the shaft and helical gear hub. Fastener 47 fit tolerances are selected for a light interference fit, as for the helical gears and the shaft. Fasteners 47 are installed and secured with nuts 48 over washers 49. Nuts 48 are locked against loosening on fasteners 47 with one of the various locking devices.

Studs or shoulder screws may be used in lieu of bolts.

The assembly is appropriate for uni-directional or bi-directional drives with helical gears. The maximum axial load capacity (due to the axial separating forces on the helical gear teeth) is determined by the strength of the nuts 48 and the threaded portion of the bolts 47.

The assembly is also appropriate for mounting two (or more) adjacent cams indexed to the required/desired relative positions prior to drilling the holes and installing the bolts.

Referring to FIGS. 5A and 5B, an intermediate stage of a gearbox (speed reducer) is comprised of a shaft 51 with an integral pinion 52 and an installed spur gear 53. The spur gear 53 is pressed-on with a light interference fit (LN or FN1 per USA Standard USAS B4.1-1967) onto the enlarged shaft portion 54 on shaft 51. Two holes, 180 degrees apart, are drilled and reamed for dowel pins (cylindrical keys) 55 whose diameter is selected for the required torque capacity based on their material strength and the strength of the shaft and spur gear hub. The reamed hole diameter tolerances are selected for a light interference fit with the dowel pins 55, as for the spur gear and the shaft. The dowel pins may be installed without any retaining devices against axial movement, relying on the friction force from the light interference fit for retention.

Alternatively, the cylindrical keys may be in the form of dowel pins with a retaining ring (snap ring) on each end or clevis pins with a head on one end and a lock pin or R-clip, or a retaining ring (snap ring) on the other end for positive axial retention.

The assembly is appropriate for uni-directional or bi-directional drives with a spur gear. Since there is no axial load on the spur gear, the retaining rings (snap rings) and the lock pins or R-clips are not mandatory.

Referring to FIGS. 6A and 6B, a hub-shaft assembly is comprised of shaft 61 with a stepped reduced diameter portion 62 on its terminus and a hub 63 of a mechanical component. The hub 63 is pressed-on with a light interference fit (LN or FN1 per USA Standard USAS B4.1-1967) onto the reduced diameter portion 62 on shaft 61. The hub 63 is seated against a shoulder 64 of the reduced diameter portion 62. Four holes, 90 degrees apart, are drilled and reamed for dowel pins (cylindrical keys) 65 whose diameter is selected for the required torque capacity based on their material strength and the strength of the shaft and the hub. The reamed hole diameter tolerances are selected for a light interference fit, as for the hub and shaft. The dowel pins and the hub are retained against axial movement with an overlapping washer 66 and a retaining ring (snap ring) 67.

Alternatively, the dowel pins and the hub may be installed without any retaining devices against axial movement, relying on the friction force from the light interference fits for retention, dispensing with the washer 66 and the retaining ring (snap ring) 67. When the depth of the holes is greater that the length of the hub bore, and the dowel pins are installed so that their ends are visible at the shaft shoulder, periodic checks/inspections can confirm that the dowel pins did not migrate out of their fully seated positions.

The assembly is appropriate for mounting mechanical components external to a gearbox (speed reducer). It may be used with uni-directional drives where an axial force is present/imposed but directed against the shoulder 64; or with bi-directional drives where no axial force is imposed/developed.

Referring to FIGS. 7A and 7B, a hub-shaft assembly is comprised of shaft 71 with a stepped reduced diameter portion 72 on its terminus and a shaft coupling hub 73. The hub 73 is pressed-on with a light interference fit (LN or FN1 per USA Standard USAS B4.1-1967), or per shaft coupling manufacturer's recommendation, onto the reduced diameter portion 72 of shaft 71. The hub 73 is seated against a shoulder 74 of the reduced diameter portion 72. Four holes, 90 degrees apart, are drilled and reamed for dowel pins (cylindrical keys) 75 whose diameter is selected for the required torque capacity based on their material strength and the strength of the shaft and hub. The reamed hole diameter tolerances are selected for a light interference fit, as for the hub and shaft. The dowel pins are installed without any retaining devices against axial movement, relying on the friction force from the light interference fits for retention. When the depth of the holes is greater than the length of the hub bore and the dowel pins are installed so that their ends are visible at the shafts shoulder, periodic checks/inspections can confirm that the dowel pins have not migrated out of their fully seated positions.

The assembly is appropriate for mounting shaft coupling hubs for either uni-directional or bi-directional drives. The complete shaft coupling assembly, including the second hub on the other shaft and the barrel connecting the two hubs, does not develop any significant axial force on the hubs.

Referring to FIGS. 8A and 8B, a hub-shaft assembly is comprised of a shaft 81 with a constant diameter terminus (with square end) and a hub 83 with a lip 85 on one end of the bore. Hub 83 is pressed-on with a light interference fit (LN or FN1 per USA Standard USAS B4.1-1967). The lip 85 of the hub bore is seated against the square end of shaft 81. Four locations, 90 degrees apart, are spot-faced 86 for machining the key holes. The holes are drilled and reamed for dowel pins (cylindrical keys) 87 whose diameter is selected for the required torque capacity based on the material strength of the shaft 81 and hub 83. The reamed hole tolerances are selected for a light interference fit, as for the hub and shaft. The dowel pins are installed without any restraining devices, relying on the friction force from the light interference fit for retention. When the depth of the holes is greater than the length of the hub bore and the dowel pins are installed so that their ends are visible at both ends of the hub, periodic checks/inspections can confirm that the dowel pins have not migrated/shifted out of their fully seated positions.

The assembly is appropriate for mounting mechanical components external to a gearbox (speed reducer). It may be used with uni-directional drives where an axial force is present/imposed but directed against the lip 85; or with bi-directional drives where no axial force is imposed/developed.

Alternatively, clevis pins can be used when the spot faces are sufficiently large to permit the clevis pin heads to be seated in them. Alternatively, rods or hollow cylinders can be used in lieu of the clevis pins. Furthermore, spring pins can be used as keys, in which case the holes need not be reamed.

Referring to FIGS. 9A and 9B, a hub-shaft assembly is comprised of a shaft 91 with a constant diameter terminus and a hub 93. The end of the shaft has circumferential notch 95 and the hub bore has a lip 96 of the same or larger diameter than the notch. The hub 93 is pressed-on with a light interference fit (LN or FN1 per USA Standard USAS B4.1-1967). The lip 96 of the hub bore is seated against the face of notch 95 of shaft 91. Four holes, 90 degrees apart, are drilled and reamed for dowel pins (cylindrical keys) 97 whose diameter is selected for the required torque capacity based on their material strength and the strength of shaft and hub. The reamed hole tolerances are selected for a light interference fit, as for the hub and shaft. The dowel pins are installed without any restraining devices, relying on the friction force from the light interference fit for retention. When the depth of the holes is greater than the length of the hub bore and the dowel pins are installed so that their ends are visible at both ends of the hub, periodic checks/inspections can confirm that the dowel pins have not migrated/shifted out of their fully seated positions.

The assembly is appropriate for mounting mechanical components external to a gearbox (speed reducer). It may be used with uni-directional drives where an axial force is imposed/developed but directed against the lip 96; or with bi-directional drives where no axial force is imposed/developed.

Alternatively, clevis pins, rods, or hollow cylinders can be used in lieu of dowel pins. Furthermore, spring pins can be used as keys, in which case the holes need not be reamed.

Referring to FIGS. 10A and 10B, a hub-shaft assembly is comprised of a shaft 101 and a mechanical component 102. The mechanical component 102 is pressed-on with a light interference fit (LN or FN1 per USA Standard USAS B4.1-1967) onto the enlarged shaft portion 105 on shaft 101. Two holes, 180 degrees apart, are drilled and reamed for dowel pins (cylindrical keys) 107 whose diameter is selected for the required torque capacity based on their material strength and the strength of the shaft and spur gear hub. The reamed hole diameter tolerances are selected for a light interference fit with the dowel pins 107, as for the mechanical component and shaft. The holes are formed in the shaft and the mechanical component hub (e.g., spur gear hub) so that the dowel pins slant (at an angle acute to an axis perpendicular to a surface through which the opening extends to prevent any axial movement of the hub on the shaft. The dowel pins are installed with retaining rings (snap rings) 108 for retention against any movement. Shoulder 110 on the hub and shoulder 112 on the enlarged portion of the shaft are machined (turned) at a slant complementary to the slant of the keys to present parallel surfaces normal to the axes of the cylindrical keys for contact with the retaining devices.

Alternatively, the cylindrical keys 107 may be in the form of rods or hollow cylinders with a retaining ring (snap ring) on each end; clevis pins with a head on one end and a retaining ring (snap ring) or a lock pin (R-clip) on the other end; or cylindrical clamping keys in the form of bolts, studs, or shoulder screws for positive retention against axial movement of the keys.

Alternatively, the dowel pins, rods, or hollow cylinders may be installed without any retaining devices, relying on the friction force from the light interference fit for retention. This assembly requires only the hub shoulder 110 to be machined (turned) at a slant complementary to the slant of the keys or to be spot-faced for machining of the holes.

The assembly is appropriate for uni-directional or bi-directional drives with mechanical components such as spur gears, brake wheels, sheaves, and other mechanical components.

In some aspects, the disclosure is drawn to a shaft, wherein the shaft comprises a portion that has an enlarged diameter ("enlarged portion"), as compared to the diameters of the adjacent portions of the shaft. The enlarged portion comprises two sides (e.g., of equal or unequal height) that are perpendicular to the axis of the shaft. An axial surface of the enlarged portion is located between the two sides. The axial surface of the enlarged portion is parallel to the axis of the shaft.

In some embodiments, the diameter of the enlarged portion of the shaft may be, e.g., about 5%, about 10%, about 15%, about 20%, about 25%, about 30%, about 35%, about 40%, about 45%, about 50%, about 75%, about 100%, about 150%, about 200%, about 300%, or about 400% larger than the diameters of the adjacent portions of the shaft.

In some embodiments, the diameter of the enlarged portion is enlarged (relative to the diameters of the adjacent portions of the shaft) by the amount approximating the diameter of an integral pinion.

In some embodiments, the diameter of the enlarged portion is enlarged (relative to the diameters of the adjacent portions of the shaft) by an amount that provides adequate clearance over the adjacent shaft diameters (the diameters of the adjacent portions of the shaft) for a cylindrical clamping key head; a nut; a washer (e.g., a plain washer or a load-equalizing washer (e.g., a rectangular, a square, or a round V-washer)); or other load-equalizing component (e.g., a saddle or a rocker) (when required); and/or a locking device (e.g., on a nut).

In some embodiments, the diameter of the enlarged portion is enlarged (relative to the diameters of the adjacent portions of the shaft) by the amount to provide sufficient space for about half of a drill bit diameter and/or, when required, space to accommodate a key head, a nut, a washer, and/or locking device (e.g., a snap ring, a lock pin, or a cotter pin).

In some embodiments, the enlarged portion of the shaft may comprise, e.g., about 5%, about 10%, about 15%, about 20%, about 25%, about 30%, about 35%, about 40%, about 45%, or about 50% of the length of the shaft.

In some embodiments, the enlarged portion of the shaft terminates prior to the termination of the shaft, e.g., the enlarged portion is not located at a terminus of the shaft.

In some embodiments, the enlarged portion of the shaft is located approximately half way down the length of the shaft from a terminus of the shaft.

In some embodiments, the enlarged portion of the shaft is located about ½, about ⅓, about ¼, about ⅕, about ⅙, about ⅐, about ⅛, about ⅑, or about ⅒ down the length of the shaft from a terminus of the shaft.

In some embodiments, the enlarged portion of the shaft is located at a terminus of the shaft.

In some aspects, the disclosure is drawn to an assembly, wherein the assembly comprises: a shaft, wherein the shaft comprises a portion that has an enlarged diameter ("enlarged portion"), as compared to the diameters of the adjacent portions of the shaft; and a hub.

The enlarged portion comprises two sides (e.g., of equal or unequal height) that are perpendicular to the axis of the shaft. An axial surface of the enlarged portion is located between the two sides. The axial surface of the enlarged portion is parallel to the axis of the shaft.

In some embodiments, the diameter of the enlarged portion of the shaft may be, e.g., about 5%, about 10%, about 15%, about 20%, about 25%, about 30%, about 35%, about 40%, about 45%, about 50%, about 75%, about 100%, about 150%, about 200%, about 300%, or about 400% larger than the diameters of the adjacent portions of the shaft.

In some embodiments, the diameter of the enlarged portion is enlarged (relative to the diameters of the adjacent portions of the shaft) by the amount approximating the diameter of an integral pinion.

In some embodiments, the diameter of the enlarged portion is enlarged (relative to the diameters of the adjacent portions of the shaft) by an amount that provides adequate clearance over the adjacent shaft diameters (the diameters of the adjacent portions of the shaft) for a cylindrical clamping key head; a nut; a washer (e.g., a plain washer or a load-equalizing washer (e.g., a rectangular, a square, or a round V-washer)); or other load-equalizing component (e.g., a saddle or a rocker) (when required); and/or a locking device (e.g., on a nut).

In some embodiments, the enlarged portion of the shaft may comprise, e.g., about 5%, about 10%, about 15%, about 20%, about 25%, about 30%, about 35%, about 40%, about 45%, or about 50% of the length of the shaft.

In some embodiments, the enlarged portion of the shaft terminates prior to the termination of the shaft, e.g., the enlarged portion is not located at a terminus of the shaft.

In some embodiments, the enlarged portion of the shaft is located approximately half way down the length of the shaft from a terminus of the shaft.

In some embodiments, the enlarged portion of the shaft is located about ½, about ⅓, about ¼, about ⅕, about ⅙, about ⅐, about ⅛, about ⅑, or about ⅒ down the length of the shaft from a terminus of the shaft.

In some embodiments, the enlarged portion of the shaft is located at a terminus of the shaft.

In some embodiments, the hub is positioned along the circumference of the enlarged portion of the shaft. For example, the hub bore is mounted on the axial surface of the enlarged portion of the shaft.

In some embodiments, the assembly further comprises a hole, e.g., a cylindrical hole, wherein the hole is located at a position of interface between the hub bore and the axial surface of the enlarged portion of the shaft (e.g., parallel to the shaft axis or at a slant relative to the shaft axis). In some embodiments, the hole is parallel to the shaft axis. In some embodiments, the hole is at a slant relative to the shaft axis. In some embodiments, the hole is at a slant relative to the shaft axis and the slant is at an angle of about 5 to about 45 degrees (e.g., about 8 to about 15 degrees) relative to the shaft axis. In some embodiments, the hole is slanted relative to the shaft axis so that it starts, e.g., entirely or partially, in the hub shoulder and exits, e.g., entirely or partially, in the shoulder of the enlarged portion of the shaft. In some embodiments, the assembly comprises 2, 3, 4, or more holes, e.g., spaced (e.g., evenly spaced or not evenly spaced) at positions of the interface between the hub bore and the axial surface of the enlarged portion of the shaft. In some embodiments, the hole extends through the length of the interface of the hub bore and the axial surface of the enlarged portion of the shaft. In some embodiments, the hole extends through about 10%, about 20%, about 30%, about 40%, about 50%, about 60%, about 70%, about 80%, or about 90% of the length of the interface of the hub bore and the axial surface of the enlarged portion of the shaft.

In some embodiments, the assembly further comprises a hole, e.g., a cylindrical hole, wherein the hole is located at an interface of the hub bore and the axial surface of the enlarged portion of the shaft (e.g., parallel to the shaft axis or at a slant relative to the shaft axis); and a key (e.g., a cylindrical key, e.g., a cylindrical clamping key or a cylindrical non-clamping key), wherein the key is located in the hole. In some embodiments, the key is a cylindrical clamping key.

In some embodiments, the cylindrical clamping key comprises a bolt. In some embodiments, the cylindrical clamping key comprises a stud. In some embodiments, the cylindrical clamping key comprises a screw (e.g., a shoulder screw). In some embodiments, the key is a cylindrical non-clamping key. In some embodiments, the cylindrical non-clamping key comprises a pin (e.g., a dowel pin, a clevis pin, a rod (e.g., a drill rod), a hollow cylinder (e.g., a tube or a pipe), or a spring pin (e.g., a split ring pin or coiled spring pin)). In some embodiments, the hole is parallel to the shaft axis. In some embodiments, the hole is at a slant relative to the shaft axis. In some embodiments, the hole is at a slant relative to the shaft axis and the slant is at an angle of about 5 to about 45 degrees (e.g., about 8 to about 15 degrees) relative to the shaft axis. In some embodiments, the hole is slanted relative to the shaft axis so that it starts, e.g., entirely or partially, in the hub shoulder and exits, e.g., entirely or partially, in the shoulder of the enlarged portion of the shaft. In some embodiments, the assembly comprises 2, 3, 4, or more holes and keys, wherein the keys are located in the holes, e.g., spaced (e.g., evenly spaced or not evenly spaced) at positions of the interface between the hub bore and the axial surface of the enlarged portion of the shaft (e.g., parallel to the shaft axis or at a slant relative to the shaft axis). In some embodiments, the hole and key extend through the length of the interface of the hub bore and the axial surface of the enlarged portion of the shaft (e.g., parallel to the shaft axis or at a slant relative to the shaft axis). In some embodiments, the hole and key extend through about 10%, about 20%, about 30%, about 40%, about 50%, about 60%, about 70%, about 80%, or about 90% of the length of the interface of the hub bore and the axial surface of the enlarged section of the shaft (e.g., parallel to the shaft axis or at a slant relative to the shaft axis). In some embodiments, the hole extends through the length of the interface of the hub bore and the axial surface of the enlarged portion of the shaft and a first terminus of the key protrudes from a first end of the hole, or first and second termini of the key protrude from first and second ends of the hole, respectively. In some embodiments, a first terminus of the key protrudes from a first end of the hole. In some embodiments, first and second termini of the key protrude from first and second ends of the hole, respectively. In some embodiments, the key comprises a bolt, a stud, or a screw (e.g., a shoulder screw), and the hole and the key extend through the entire length of the interface of the hub bore and the axial surface of the enlarged portion of the shaft.

In some embodiments, the assembly further comprises a hole, e.g., a cylindrical hole, wherein the hole is located at an interface of the hub bore and the enlarged portion of the shaft (e.g., parallel to the shaft axis or at a slant relative to the shaft axis); a key (e.g., a cylindrical key, e.g., a cylindrical non-clamping key), wherein the key is located in the hole; and an end restraint, e.g., wherein the end restraint prevents or reduces movement (e.g., axial movement) of the key and/or the hub (e.g., as compared to the amount of movement (e.g., axial movement) in the absence of the end restraint).

In some embodiments, the end restraint comprises a head, a lock pin (e.g., an R-clip or a cotter pin), or a retaining ring (e.g., a snap ring). In some embodiments, the assembly comprises an end restraint at a first terminus of the key (e.g., wherein a terminus of the key protrudes from a first end of the hole). In some embodiments, the assembly comprises an end restraint at first and second termini of the key (e.g., wherein first and second termini of the key protrude from first and second ends of the hole, respectively). In some embodiments, the key is a cylindrical non-clamping key. In some embodiments, the cylindrical non-clamping key comprises a pin (e.g., a dowel pin, a clevis pin, a rod (e.g., a drill rod), a hollow cylinder (e.g., a tube or a pipe), or a spring pin (e.g., a split ring pin or coiled spring pin)). In some embodiments, the hole is parallel to the shaft axis. In some embodiments, the hole is at a slant relative to the shaft axis. In some embodiments, the hole is at a slant relative to the shaft axis and the slant is at an angle of about 5 to about 45 degrees (e.g., about 8 to about 15 degrees) relative to the shaft axis. In some embodiments, the hole is slanted relative to the shaft axis so that it starts, e.g., entirely or partially, in the hub shoulder and exits, e.g., entirely or partially, in the shoulder of the enlarged portion of the shaft. In some embodiments, the assembly comprises 2, 3, 4, or more holes and keys, wherein the keys are located in the holes, e.g., spaced (e.g., evenly spaced or not evenly spaced) at positions of the interface between the hub bore and the axial surface of the enlarged portion of the shaft (e.g., parallel to the shaft axis or at a slant relative to the shaft axis). In some embodiments, the hole and key extend through the length of the interface of the hub bore and the axial surface of the enlarged portion of the shaft (e.g., parallel to the shaft axis or at a slant relative to the shaft axis). In some embodiments, the hole and key extend through about 10%, about 20%, about 30%, about 40%, about 50%, about 60%, about 70%, about 80%, or about 90% of the length of the interface of the hub bore and the axial surface of the enlarged section of the shaft (e.g., parallel to the shaft axis or at a slant relative to the shaft axis). In some embodiments, the hole extends through the length of the interface of the hub bore and the axial surface of the enlarged portion of the shaft and a first terminus of the key protrudes from a first end of the hole, or first and second termini of the key protrude from first and second ends of the hole, respectively. In some embodiments, a first terminus of the key protrudes from a first end of the hole. In some embodiments, first and second termini of the key protrude from first and second ends of the hole, respectively. In some embodiments, the key comprises a bolt, a stud, or a screw (e.g., a shoulder screw), and the hole and the key extend through the entire length of the interface of the hub bore and the axial surface of the enlarged portion of the shaft.

In some embodiments, the assembly comprises a key, e.g., a bolt, a screw (e.g., a shoulder screw), or a stud, wherein the key extends through full length of hub. In some embodiments, the assembly further comprises a clamping key head; a nut; a washer (e.g., a plain washer or a load-equalizing washer (e.g., a rectangular, a square, or a round V-washer)) or other load-equalizing component (e.g., a saddle or a rocker) (when required); and/or a locking device (e.g., on a nut).

In some embodiments, the assembly comprises an assembly shown in FIGS. 2A and 2B.

In some embodiments, the assembly comprises an assembly shown in FIGS. 3A and 3B.

In some embodiments, the assembly comprises an assembly shown in FIGS. 4A and 4B.

In some embodiments, the assembly comprises a key, e.g., a pin (e.g., dowel pin or clevis pin), wherein the key extends through full length of hub. In some embodiments, the assembly further comprises an end restraint, e.g., a snap ring, with or without a plain washer.

In some embodiments, the assembly comprises a key without an end restraint, wherein the key extends through full length of the hub or less than the full length of the hub. In some embodiments, the assembly comprises a clevis pin with a lock pin (e.g., an R-clip or a cotter pin) and/or a retaining ring.

In some embodiments, the assembly comprises an assembly shown in FIGS. 5A and 5B.

In some aspects, the disclosure is drawn to an assembly, wherein the assembly comprises: a shaft, wherein the shaft comprises a terminus of reduced diameter, e.g., the terminus of the shaft is stepped ("stepped terminus"), as compared to the diameter of the adjacent portion of the shaft; and a hub.

In some embodiments, the diameter of the stepped terminus of the shaft may be, e.g., about 5%, about 10%, about 15%, about 20%, about 25%, about 30%, about 35%, about 40%, about 45%, or about 50% smaller than the diameter of the shaft that is not stepped.

In some embodiments, the stepped terminus of the shaft may comprise, e.g., about 5%, about 10%, about 15%, about 20%, about 25%, about 30%, about 35%, about 40%, about 45%, or about 50% of the length of the shaft.

In some embodiments, the hub bore is positioned along the axial surface of the stepped terminus of the shaft. E.g., the hub is mounted on the stepped terminus of the shaft.

In some embodiments, the assembly further comprises a hole, e.g., a cylindrical hole, wherein the hole is located at a position of interface between the hub bore and the axial surface of the stepped terminus of the shaft (e.g., parallel to the shaft axis or at a slant relative to the shaft axis). In some embodiments, the hole is parallel to the shaft axis. In some embodiments, the hole is at a slant relative to the shaft axis. In some embodiments, the hole is at a slant relative to the shaft axis and the slant is at an angle of about 5 to about 45 degrees (e.g., about 8 to about 15 degrees) relative to the shaft axis. In some embodiments, the hole in slanted relative to the shaft axis so that it starts, e.g., entirely or partially, in the hub shoulder and exits, e.g., entirely or partially, in the shoulder of the enlarged portion of the shaft. In some embodiments, the assembly comprises 2, 3, 4, or more holes, e.g., spaced (e.g., evenly spaced or not evenly spaced) at positions of the interface between the hub bore and the axial surface of the stepped terminus of the shaft (e.g., parallel to the shaft axis or at a slant relative to the shaft axis). In some embodiments, the hole extends through the length of the interface of the hub bore and the axial surface of the stepped terminus of the shaft (e.g., parallel to the shaft axis or at a slant relative to the shaft axis). In some embodiments, the hole extends through the length of the interface of the hub bore and the axial surface of the stepped terminus of the shaft (e.g., parallel to the shaft axis or at a slant relative to the shaft axis) and further extends into the shaft that is not stepped. In some embodiments, the hole extends through about 10%, about 20%, about 30%, about 40%, about 50%, about 60%, about 70%, about 80%, or about 90% of the length of the interface of the hub bore and the axial surface of the stepped terminus of the shaft (e.g., parallel to the shaft axis or at a slant relative to the shaft axis).

In some embodiments, the assembly further comprises a hole, e.g., a cylindrical hole, wherein the hole is located at an interface of the hub bore and the axial surface of the stepped terminus of the shaft (e.g., parallel to the shaft axis or at a slant relative to the shaft axis); and a key (e.g., a cylindrical key, e.g., a cylindrical non-clamping key), wherein the key is located in the hole.

In some embodiments, the key is a cylindrical non-clamping key. In some embodiments, the cylindrical non-clamping key comprises a pin (e.g., a dowel pin, a clevis pin, a rod (e.g., a drill rod), or a spring pin (e.g., a split ring pin or coiled spring pin)). In some embodiments, the hole is parallel to the shaft axis. In some embodiments, the hole is at a slant relative to the shaft axis. In some embodiments, the hole is at a slant relative to the shaft axis and the slant is at an angle of about 5 to about 45 degrees (e.g., about 8 to about 15 degrees) relative to the shaft axis. In some embodiments, the hole in slanted relative to the shaft axis so that it starts, e.g., entirely or partially, in the hub shoulder and exits, e.g., entirely or partially, in the shoulder of the enlarged portion of the shaft. In some embodiments, the assembly comprises 2, 3, 4, or more holes and keys, wherein the keys are located in the holes, e.g., spaced (e.g., evenly spaced or not evenly spaced) at positions of the interface between the hub bore and the axial surface of the stepped terminus of the shaft (e.g., parallel to the shaft axis). In some embodiments, the hole and key extend through the length of the interface of the hub bore and the axial surface of the stepped terminus of the shaft (e.g., parallel to the shaft axis or at a slant relative to the shaft axis). In some embodiments, the hole and key extend through the length of the interface of the hub bore and the axial surface of the stepped terminus of the shaft (e.g., parallel to the shaft axis or at a slant relative to the shaft axis) and further extend into the shaft that is not stepped. In some embodiments, the hole and key extend through about 10%, about 20%, about 30%, about 40%, about 50%, about 60%, about 70%, about 80%, or about 90% of the length of the interface of the hub bore and the axial surface of the stepped terminus of the shaft (e.g., parallel to the shaft axis or at a slant relative to the shaft axis). In some embodiments, a terminus of the key protrudes from the hole (e.g., on the shaft terminus side).

In some embodiments, the assembly further comprises a hole, e.g., a cylindrical hole, wherein the hole is located at an interface of the hub bore and the axial surface of the stepped terminus of the shaft (e.g., parallel to the shaft axis or at a slant relative to the shaft axis); a key (e.g., a cylindrical key, e.g., a cylindrical non-clamping key), wherein the key is located in the hole; and an end restraint, e.g., wherein the end restraint prevents or reduces movement (e.g., axial movement) of the key and/or the hub (e.g., as compared to the amount of movement (e.g., axial movement) in the absence of the end restraint).

In some embodiments, the end restraint comprises a shaft washer (e.g., a plain washer that overlaps or covers the terminus of the key), and a retaining ring (e.g., snap ring). For example, a retaining ring on the shaft can retain a shaft washer, see, e.g., FIGS. 6A and 6B. In some embodiments, the assembly comprises an end restraint at a terminus of the key (e.g., wherein the terminus of the key protrudes from the hole). In some embodiments, the key is a cylindrical non-clamping key. In some embodiments, the cylindrical non-clamping key comprises a pin (e.g., a dowel pin, a clevis pin, a rod (e.g., a drill rod), a hollow cylinder (e.g., a tube or pipe), or a spring pin (e.g., a split ring pin or coiled spring pin)). In some embodiments, the hole and key extend through the length of the interface of the hub bore and the axial surface of the stepped terminus of the shaft (e.g., parallel to the shaft axis or at a slant relative to the shaft axis). In some embodiments, the hole is parallel to the shaft axis. In some embodiments, the hole is at a slant relative to the shaft axis. In some embodiments, the hole is at a slant relative to the shaft axis and the slant is at an angle of about 5 to about 45 degrees (e.g., about 8 to about 15 degrees) relative to the shaft axis. In some embodiments, the hole is slanted relative to the shaft axis so that it starts, e.g., entirely or partially, in the hub shoulder and exits, e.g., entirely or partially, in the shoulder of the enlarged portion of the shaft. In some embodiments, the assembly comprises 2, 3, 4, or more holes and keys, wherein the keys are located in the holes, e.g., spaced (e.g., evenly spaced or not evenly spaced) at positions of the interface between the hub bore and the axial surface of the enlarged portion of the shaft (e.g., parallel to the shaft axis or at a slant relative to the shaft axis). In some embodiments, the hole extends through the length of the interface of the hub bore and the axial surface of the stepped terminus of the shaft (e.g., parallel to the shaft axis or at a slant relative to the shaft axis) and further extends into the shaft that is not stepped. In some embodiments, the hole and key extend through about 10%, about 20%, about 30%, about 40%, about 50%, about 60%, about 70%, about 80%, or about 90% of the length of the interface of the hub bore and the axial surface of the stepped terminus of the shaft (e.g., parallel to the shaft axis or at a slant relative to the shaft axis). In some embodiments, the hole extends through the length of the interface of the hub bore and the axial surface of the stepped terminus of the shaft and a terminus of the key protrudes from the hole (e.g., on the shaft terminus side).

In some embodiments, the assembly comprises a hub of a bevel gear. In some embodiments, the assembly comprises a key, e.g., a pin (e.g., a dowel pin), wherein the key extends the full length of the hub or less than the full length of the hub. In some embodiments, the assembly further comprises an end restraint, e.g., a plain washer (e.g., overlapping the key) and snap ring on the shaft.

In some embodiments, the assembly comprises an assembly shown in FIGS. 6A and 6B.

In some embodiments, the assembly comprises a key (e.g., dowel pin) without an end restraint, wherein the key extends the full length of the hub or less than the full length of the hub. There are no locks or restraints of any kind.

In some embodiments, the assembly comprises an assembly shown in FIGS. 7A and 7B.

In some embodiments, the assembly further comprises a shaft coupling hub (e.g., a gear-toothed shaft coupling hub), wherein a mating (internally-toothed) barrel is seated over the coupling hub (and an end restraint (if present)). In some embodiments, the barrel couples the assembly to a shaft coupling hub. In some embodiments, the barrel couples the assembly, e.g., to a shaft coupling hub of a drive motor, gearbox, brake wheel, or other component.

In some embodiments, the assembly further comprises a shaft coupling hub (e.g., a toothed shaft coupling hub), wherein a connecting metallic grid weaves between its teeth and the corresponding teeth of an opposite shaft coupling hub. In some embodiments, the metallic grid couples the assembly, e.g., to a shaft coupling hub of a drive motor, gearbox, brake wheel, or other component.

In some embodiments, the assembly comprises another type of shaft coupling (e.g., composite disc type, roller chain and sprocket type, jaw with elastomeric spider type, or another design variation).

In some embodiments, the assembly further comprises a rigid shaft coupling hub (e.g. a flanged shaft coupling hub) wherein a mating flange of a drive motor, gearbox, brake wheel, or other component is fastened to it.

In some embodiments, the assembly comprises an assembly shown in FIGS. 8A and 8B.

In some aspects, the disclosure is drawn to an assembly, wherein the assembly comprises: a shaft, wherein the shaft is of uniform diameter; and a hub.

In some embodiments, the hub bore is positioned along the axial surface of the terminus of the shaft. E.g., the hub is mounted on the terminus of the shaft.

In some embodiments, the terminus of the hub at the shaft terminus comprises an overhang (e.g., lip) in the bore of the hub or is closed (e.g., entirely closed or closed except for a vent hole) on one end of the bore, e.g., such that the hub is restrained from moving further onto the shaft, e.g., away from the terminus.

In some embodiments, the assembly further comprises a hole, e.g., a cylindrical hole, wherein the hole is located at a position of interface between the hub bore and the axial surface of the terminus of the shaft (e.g., parallel to the shaft axis or at a slant relative to the shaft axis). In some embodiments, the hole is parallel to the shaft axis. In some embodiments, the hole is at a slant relative to the shaft axis. In some embodiments, the hole is at a slant relative to the shaft axis and the slant is at an angle of about 5 to about 45 degrees (e.g., about 8 to about 15 degrees) relative to the shaft axis. In some embodiments, the hole is slanted relative to the shaft axis so that it starts, e.g., entirely or partially, in the hub shoulder and exits, e.g., entirely or partially, in the shoulder of the enlarged portion of the shaft. In some embodiments, the assembly comprises 2, 3, 4, or more holes, e.g., spaced (e.g., evenly spaced or not evenly spaced) at positions of the interface between the hub bore and the axial surface of the terminus of the shaft (e.g., parallel to the shaft axis or at a slant relative to the shaft axis). In some embodiments, the hole extends through the length of the interface of the hub bore and the axial surface of the terminus of the shaft (e.g., parallel to the shaft axis or at a slant relative to the shaft axis). In some embodiments, the hole extends through the length of the interface of the hub bore and the axial surface of the terminus of the shaft (e.g., parallel to the shaft axis) and further extends into the shaft that is not interfacing with the hub bore. In some embodiments, the hole extends through about 10%, about 20%, about 30%, about 40%, about 50%, about 60%, about 70%, about 80%, or about 90% of the length of the interface of the hub bore and the axial surface of the terminus of the shaft (e.g., parallel to the shaft axis or at a slant relative to the shaft axis).

In some embodiments, the shaft into which a portion of the hole diameter is machined comprises a constant diameter terminus of the shaft (e.g., with a square end) and the hub bore (e.g., with a lip on one end).

In some embodiments, the shaft into which a portion of the hole diameter is machined comprises a constant diameter terminus with a circumferential corned notch and a matching lip on one end of the hub bore.

In some embodiments, the assembly further comprises a hole, e.g., a cylindrical hole, wherein the hole is located at an interface of the hub bore and the axial surface of the terminus of the shaft (e.g., parallel to the shaft axis or at a slant relative to the shaft axis); and a key (e.g., a cylindrical key, e.g., a cylindrical non-clamping key), wherein the key is located in the hole.

In some embodiments, the key is a cylindrical non-clamping key. In some embodiments, the cylindrical non-clamping key comprises a pin (e.g., a dowel pin, a clevis pin, a rod (e.g., a drill rod), a hollow cylinder (e.g., a tube or a pipe), or a spring pin (e.g., a split ring pin or coiled spring pin)). In some embodiments, the hole is parallel to the shaft axis. In some embodiments, the hole is at a slant relative to the shaft axis. In some embodiments, the hole is at a slant relative to the shaft axis and the slant is at an angle of about 5 to about 45 degrees (e.g., about 8 to about 15 degrees) relative to the shaft axis. In some embodiments, the hole is slanted relative to the shaft axis so that it starts, e.g., entirely or partially, in the hub shoulder and exits, e.g., entirely or partially, in the shoulder of the enlarged portion of the shaft. In some embodiments, the assembly comprises 2, 3, 4, or more holes and keys, wherein the keys are located in the holes, e.g., spaced (e.g., evenly spaced or not evenly spaced) at positions of the interface between the hub bore and the axial surface of the terminus of the shaft (e.g., parallel to the shaft axis or at a slant relative to the shaft axis). In some embodiments, the hole and key extend through the length of the interface of the hub bore and the axial surface of the terminus of the shaft (e.g., parallel to the shaft axis or at a slant relative to the shaft axis). In some embodiments, the hole and key extend through the length of the interface of the hub bore and the axial surface of the terminus of the shaft (e.g., parallel to the shaft axis or at a slant relative to the shaft axis) and further extend into the shaft that is not interfacing with the hub bore. In some embodiments, the hole and key extend through about 10%, about 20%, about 30%, about 40%, about 50%, about 60%, about 70%, about 80%, or about 90% of the length of the interface of the hub bore and the axial surface of the terminus of the shaft (e.g., parallel to the shaft axis or at a slant relative to the shaft axis).

In some embodiments, a terminus of the key protrudes from the hole (e.g., on the shaft terminus side).

In some embodiments, the assembly further comprises a hole, e.g., a cylindrical hole, wherein the hole is located at an interface of the hub bore and the axial surface of the terminus of the shaft (e.g., parallel to the shaft axis or at a slant relative to the shaft axis); a key (e.g., a cylindrical key, e.g., a cylindrical non-clamping key), wherein the key is located in the hole; and an end restraint, e.g., wherein the end restraint prevents or reduces movement (e.g., axial movement) of the key and/or the hub (e.g., as compared to the amount of movement (e.g., axial movement) in the absence of the end restraint).

In some embodiments, the end restraint comprises a shaft washer (e.g., a plain washer that overlaps or covers the terminus of the key), and a retaining ring (e.g., snap ring). For example, a retaining ring on the shaft can retain a shaft washer, see, e.g., FIGS. 6A and 6B. In some embodiments, the assembly comprises an end restraint at a terminus of the key (e.g., wherein the terminus of the key protrudes from the hole). In some embodiments, the key is a cylindrical non-clamping key. In some embodiments, the cylindrical non-clamping key comprises a pin (e.g., a dowel pin, a clevis pin, a rod (e.g., a drill rod), a hollow cylinder (e.g., a tube or a pipe), or a spring pin (e.g., a split ring pin or coiled spring pin)). In some embodiments, the key is a cylindrical non-clamping key. In some embodiments, the cylindrical non-clamping key comprises a pin (e.g., a dowel pin, a clevis pin, a rod (e.g., a drill rod), a hollow cylinder (e.g., a tube or a pipe), or a spring pin (e.g., a split ring pin or coiled spring pin)). In some embodiments, the hole is parallel to the shaft axis. In some embodiments, the hole is at a slant relative to the shaft axis. In some embodiments, the hole is at a slant relative to the shaft axis and the slant is at an angle of about 5 to about 45 degrees (e.g., about 8 to about 15 degrees) relative to the shaft axis. In some embodiments, the hole is slanted relative to the shaft axis so that it starts, e.g., entirely or partially, in the hub shoulder and exits, e.g., entirely or partially, in the shoulder of the enlarged portion of the shaft. In some embodiments, the assembly comprises 2, 3, 4, or more holes and keys, wherein the keys are located in the holes, e.g., spaced (e.g., evenly spaced or not evenly spaced) at positions of the interface between the hub bore and the axial surface of the enlarged portion of the shaft (e.g., parallel to the shaft axis or at a slant relative to the shaft axis). In some embodiments, the hole and key extend through the length of the interface of the hub bore and the axial surface of the terminus of the shaft (e.g., parallel to the shaft axis or at a slant relative to the shaft axis). In some embodiments, the hole extends through the length of the interface of the hub bore and the axial surface of the terminus of the shaft (e.g., parallel to the shaft axis or at a slant relative to the shaft axis) and further extends into the shaft that is not interfacing with the hub bore. In some embodiments, the hole and key extend through about 10%, about 20%, about 30%, about 40%, about 50%, about 60%, about 70%, about 80%, or about 90% of the length of the interface of the hub bore and the axial surface of the terminus of the shaft (e.g., parallel to the shaft axis or at a slant relative to the shaft axis). In some embodiments, the hole extends through the length of the interface of the hub bore and the axial surface of the terminus of the shaft and a terminus of the key protrudes from the hole (e.g., on the shaft terminus side).

In some embodiments, the assembly further comprises a shaft coupling hub (e.g., a gear-toothed shaft coupling hub), wherein a mating (internally-toothed) barrel is seated over the coupling hub (and an end restraint (if present)). In some embodiments, the barrel couples the assembly to a shaft coupling hub. In some embodiments, the barrel couples the assembly, e.g., to a shaft coupling hub of a drive motor, gearbox, brake wheel, or other component.

In some embodiments, the assembly further comprises a shaft coupling hub (e.g., a toothed shaft coupling hub), wherein a connecting metallic grid weaves between its teeth and the corresponding teeth of an opposite shaft coupling hub. In some embodiments, the metallic grid couples the assembly, e.g., to a shaft coupling hub of a drive motor, gearbox, brake wheel, or other component.

In some embodiments, the assembly comprises another type of shaft coupling (e.g., composite disc type, roller chain and sprocket type, jaw with elastomeric spider type, or another design variation).

In some embodiments, the assembly further comprises a rigid shaft coupling hub (e.g. a flanged shaft coupling hub) wherein a mating flange of a drive motor, gearbox, brake wheel, or other component is fastened to it.

In some embodiments, the assembly comprises a hub of a bevel gear.

In some embodiments, the assembly comprises an assembly shown in FIGS. 8A and 8B.

In some embodiments, the assembly comprises an assembly shown in FIGS. 9A and 9B.

In some aspects, the disclosure is drawn to a method of making an assembly (e.g., an assembly described herein).

The method comprises having a hole machined (e.g., machining a hole) concurrently in the shaft and hub bore, wherein the hole is machined through the interface of the shaft and the hub bore (e.g., in a direction parallel to the shaft axis or at a slant relative to the shaft axis). A portion (e.g., about half) of the hole diameter is in the shaft and a portion (e.g., about half) of the hole diameter is in the hub. In some embodiments, the hole is parallel to the shaft axis. In some embodiments, the hole is at a slant relative to the shaft axis. In some embodiments, the hole is at a slant relative to the shaft axis and the slant is at an angle of about 5 to about 45 degrees (e.g., about 8 to about 15 degrees) relative to the shaft axis. In some embodiments, the hole is slanted relative to the shaft axis so that it starts, e.g., entirely or partially, in the hub shoulder and exits, e.g., entirely or partially, in the shoulder of the enlarged portion of the shaft.

In some embodiments, the machining comprises drilling.

In some embodiments, the machining comprises drilling and reaming.

In some embodiments, the shaft into which a portion of the hole diameter is machined comprises an enlarged portion of the shaft and the portion of the hole diameter is machined through a position on the axial surface of the enlarged portion.

In some embodiments, the shaft into which a portion of the hole diameter is machined comprises a stepped terminus of the shaft and the portion of the hole diameter is machined through a position on the axial surface of the stepped terminus.

In some embodiments, the shaft into which a portion of the hole diameter is machined comprises a terminus of the shaft (e.g., of a shaft of uniform diameter) and the portion of the hole diameter is machined through a position on the axial surface of the terminus.

In some embodiments, prior to machining the hole, the machining (e.g., drill) location is spot-faced to present a flat surface for the machining of the hole.

In some embodiments, prior to machining the hole, the machining (e.g., drill) location is spot-faced to present a flat surface for the machining of the hole at a slant to the shaft axis.

In some embodiments, the hole is machined to extend through the length of the interface of the hub bore and the shaft (e.g., the axial surface of an enlarged portion or the axial surface of a stepped terminus of the shaft) (e.g., parallel to the shaft axis or at a slant relative to the shaft axis).

In some embodiments, the hole is machined to extend through about 10%, about 20%, about 30%, about 40%, about 50%, about 60%, about 70%, about 80%, or about 90% of the length of the interface of the hub bore and the shaft (e.g., the axial surface of an enlarged portion or the axial surface of a stepped terminus of the shaft) (e.g., parallel to the shaft axis or at a slant relative to the shaft axis).

In some embodiments, the hole is machined to extend through the length of the interface of the hub bore and the axial surface of a stepped terminus of the shaft (e.g., parallel to the shaft axis or at a slant relative to the shaft axis) and to further extend into the shaft that is not stepped.

In some embodiments, 1, 2, 3, 4, 5, 6, or more holes are machined, e.g., spaced (e.g., evenly spaced or not evenly spaced) at positions of the interface between the hub bore and the shaft (e.g., parallel to the shaft axis or at a slant relative to the shaft axis).

In some embodiments, a cylindrical hole is machined.

In some embodiments, the method further comprises having a key (e.g., a cylindrical key, e.g., a cylindrical clamping key or a cylindrical non-clamping key) inserted (e.g., pressed) (e.g., inserting (e.g., pressing)) into the hole. In some embodiments, the key is a cylindrical clamping key. In some embodiments, the key comprises a bolt. In some embodiments, the key comprises a stud. In some embodiments, the key comprises a screw (e.g., a shoulder screw). In some embodiments, the key is a cylindrical non-clamping key. In some embodiments, the cylindrical non-clamping key comprises a pin (e.g., a dowel pin, a clevis pin, a rod (e.g., a drill rod), a hollow cylinder (e.g., a tube or a pipe), or a spring pin (e.g., a split ring pin or coiled spring pin)). In some embodiments, a first terminus of the key protrudes from a first end of the hole. In some embodiments, first and second termini of the key protrude from first and second ends of the hole, respectively.

In some embodiments, the face of the shoulder of the enlarged portion of the shaft where the hole exits is machined (e.g., turned) at an angle that presents a surface normal to the axis of the key.

In some embodiments, the face of the hub shoulder where the hole starts is machined (e.g., turned) at an angle that presents a surface normal to the axis of the key.

In some embodiments, the method further comprises having a key (e.g., a cylindrical key, e.g., a cylindrical non-clamping key) inserted (e.g., pressed) (e.g., inserting (e.g., pressing)) into the hole and having an end restraint attached (e.g., attaching) on a terminus of the key (e.g., a terminus of a key that protrudes from a hole). In some embodiments, the end restraint comprises a head, a lock pin (e.g., an R-clip or a cotter pin), or a retaining ring (e.g., a snap ring). In some embodiments, e.g., wherein the shaft into which a portion of the hole diameter is machined comprises a stepped terminus of the shaft, the end restraint comprises a shaft washer (e.g., a plain washer that overlaps or covers the terminus of the key). In some embodiments, an end restraint is attached at a first terminus of the key (e.g., wherein a first terminus or first and second termini of the key protrude from a first end or first and second ends of the hole, respectively). In some embodiments, an end restraint is attached at each of first and second termini of the key (e.g., wherein first and second termini of the key protrude from first and second ends of the hole, respectively). In some embodiments, the key is a cylindrical non-clamping key. In some embodiments, the cylindrical non-clamping key comprises a pin (e.g., a dowel pin, a clevis pin, a rod (e.g., a drill rod), a hollow cylinder (e.g., a tube or a pipe), or a spring pin (e.g., a split ring pin or coiled spring pin)).

In some embodiments, the method further comprises having a key (e.g., a cylindrical key, e.g., a cylindrical non-clamping key) inserted (e.g., pressed) (e.g., inserting (e.g., pressing)) into the hole and having a shaft coupling hub attached (e.g., seated) (e.g., attaching (e.g., seating)) on a terminus of the shaft. In some embodiments, a hub-to-hub connecting element (e.g., an internally-toothed barrel, a metallic grid, a composite disc, a roller chain, or an elastomeric spider) couples the assembly, e.g., to the shaft coupling hub of a drive motor, a gearbox, a brake wheel, or other component. In some embodiments, the connecting element couples the assembly to a shaft coupling hub.

In some aspects, the disclosure is drawn to a method of obtaining an interlocking shaft and hub with an interference fitted cylindrical key between the shaft and hub.

The method comprises having a hole machined (e.g., machining a hole) concurrently in the shaft and hub bore, wherein the hole is machined through the interface of the shaft and the hub bore (e.g., in a direction parallel to the shaft axis or at a slant relative to the shaft axis), and having a key (e.g., a cylindrical key, e.g., a cylindrical clamping key) inserted (e.g., pressed) (e.g., inserting (e.g., pressing)) into the hole. A portion (e.g., about half) of the hole diameter is in the shaft and a portion (e.g., about half) of the hole diameter is in the hub. In some embodiments, the hole is parallel to the shaft axis. In some embodiments, the hole is at a slant relative to the shaft axis. In some embodiments, the hole is at a slant relative to the shaft axis and the slant is at an angle of about 5 to about 45 degrees (e.g., about 8 to about 15 degrees) relative to the shaft axis. In some embodiments, the hole is slanted relative to the shaft axis so that it starts, e.g., entirely or partially, in the hub shoulder and exits, e.g., entirely or partially, in the shoulder of the enlarged portion of the shaft.

In some embodiments, the machining comprises drilling.

In some embodiments, the machining comprises drilling and reaming.

In some embodiments, the shaft into which a portion of the hole diameter is machined comprises an enlarged portion of the shaft and the portion of the hole diameter is machined through a position on the axial surface of the enlarged portion.

In some embodiments, the face of the shoulder of the enlarged portion of the shaft where the hole exits is machined (e.g., turned) at an angle that presents a surface normal to the axis of the key.

In some embodiments, the shaft into which a portion of the hole diameter is machined comprises a stepped terminus of the shaft and the portion of the hole diameter is machined through a position on the axial surface of the stepped terminus.

In some embodiments, the shaft into which a portion of the hole diameter is machined comprises a terminus of the shaft (e.g., of a shaft of uniform diameter) and the portion of the hole diameter is machined through a position on the axial surface of the terminus.

In some embodiments, prior to machining the hole, the machining (e.g., drill) location is spot-faced to present a flat surface for the machining of the hole.

In some embodiments, prior to machining the hole, the machining (e.g., drill) location is spot-faced to present a flat surface for the machining of the hole at a slant to the shaft axis.

In some embodiments, the hole is machined to extend through the length of the interface of the hub bore and the shaft (e.g., the axial surface of an enlarged portion or the axial surface of a stepped terminus of the shaft) (e.g., parallel to the shaft axis or at a slant relative to the shaft axis).

In some embodiments, the hole is machined to extend through about 10%, about 20%, about 30%, about 40%, about 50%, about 60%, about 70%, about 80%, or about 90% of the length of the interface of the hub bore and the shaft (e.g., the axial surface of an enlarged portion or the axial surface of a stepped terminus of the shaft) (e.g., parallel to the shaft axis or at a slant relative to the shaft axis).

In some embodiments, the hole is machined to extend through the length of the interface of the hub bore and the axial surface of a stepped terminus of the shaft (e.g., parallel to the shaft axis) and to further extend into the shaft that is not stepped.

In some embodiments, 1, 2, 3, 4, 5, 6, or more holes are machined, e.g., spaced (e.g., evenly spaced or not evenly spaced) at positions of the interface between the hub bore and the shaft (e.g., parallel to the shaft axis or at a slant relative to the shaft axis).

In some embodiments, a cylindrical hole is machined.

In some embodiments, the method further comprises having a key (e.g., a cylindrical key, e.g., a cylindrical clamping key or a cylindrical non-clamping key) inserted (e.g., pressed) (e.g., inserting (e.g., pressing)) into the hole. In some embodiments, the key is a cylindrical clamping key. In some embodiments, the key comprises a bolt. In some embodiments, the key comprises a stud. In some embodiments, the key comprises a screw (e.g., a shoulder screw). In some embodiments, the key is a cylindrical non-clamping key. In some embodiments, the cylindrical non-clamping key comprises a pin (e.g., a dowel pin, a clevis pin, a rod (e.g., a drill rod), a hollow cylinder (e.g., a tube or a pipe), or a spring pin (e.g., a split ring pin or coiled spring pin)). In some embodiments, a first terminus of the key protrudes from a first end of the hole. In some embodiments, first and second termini of the key protrude from first and second ends of the hole, respectively.

In some embodiments, the face of the shoulder of the enlarged portion of the shaft where the hole exits is machined (e.g., turned) at an angle that presents a surface normal to the axis of the key.

In some embodiments, the face of the hub shoulder where the hole starts is machined (e.g., turned) at an angle that presents a surface normal to the axis of the key.

In some embodiments, the method further comprises having a key (e.g., a cylindrical key, e.g., a cylindrical non-clamping key) inserted (e.g., pressed) (e.g., inserting (e.g., pressing)) into the hole and having an end restraint attached (e.g., attaching) on a terminus of the key (e.g., a terminus of a key that protrudes from a hole). In some embodiments, the end restraint comprises a head, a lock pin (e.g., an R-clip or a cotter pin), or a retaining ring (e.g., a snap ring). In some embodiments, e.g., wherein the shaft into which a portion of the hole diameter is machined comprises a stepped terminus of the shaft, the end restraint comprises a shaft washer (e.g., a plain washer that overlaps or covers the terminus of the key). In some embodiments, an end restraint is attached at a first terminus of the key (e.g., wherein a first terminus or first and second termini of the key protrude from a first end or first and second ends of the hole, respectively). In some embodiments, an end restraint is attached at each of first and second termini of the key (e.g., wherein first and second termini of the key protrude from first and second ends of the hole, respectively). In some embodiments, the key is a cylindrical non-clamping key. In some embodiments, the cylindrical non-clamping key comprises a pin (e.g., a dowel pin, a clevis pin, a rod (e.g., a drill rod), a hollow cylinder (e.g., a tube or a pipe), or a spring pin (e.g., a split ring pin or coiled spring pin)).

In some embodiments, the method further comprises having a key (e.g., a cylindrical key, e.g., a cylindrical non-clamping key) inserted (e.g., pressed) (e.g., inserting (e.g., pressing)) into the hole and having a shaft coupling hub attached (e.g., seated) (e.g., attaching (e.g., seating)) on a terminus of the shaft. In some embodiments, a hub-to-hub connecting element (e.g., an internally-toothed barrel, a metallic grid, a composite disc, a roller chain, or an elastomeric spider) couples the assembly, e.g., to the shaft coupling hub of a drive motor, a gearbox, a brake wheel, or other component. In some embodiments, the connecting element couples the assembly to a shaft coupling hub.

In some aspects, the disclosure is drawn to a method of precise indexing of a shaft and a hub (e.g., a hub of gears). Precise indexing refers to hubs (e.g., of gears) being indexed with respect to each other so that their teeth concurrently contact the teeth of a mating pinion (e.g., double helical or herringbone pinions) so as to share a transmitted gear tooth load close to 50%-50%.

The method comprises having a hole machined (e.g., machining a hole) concurrently in the shaft and hub bore, wherein the hole is machined through the interface of the shaft and the hub bore (e.g., in a direction parallel to the shaft axis or at a slant relative to the shaft axis). A portion (e.g., about half) of the hole diameter is in the shaft and a portion (e.g., about half) of the hole diameter is in the hub. In some embodiments, the hole is parallel to the shaft axis. In some embodiments, the hole is at a slant relative to the shaft axis. In some embodiments, the hole is at a slant relative to the shaft axis and the slant is at an angle of about 5 to about 45 degrees (e.g., about 8 to about 15 degrees) relative to the shaft axis. In some embodiments, the hole is slanted relative to the shaft axis so that it starts, e.g., entirely or partially, in the hub shoulder and exits, e.g., entirely or partially, in the shoulder of the enlarged portion of the shaft.

In some embodiments, the machining comprises drilling.

In some embodiments, the machining comprises drilling and reaming.

In some embodiments, the shaft into which a portion of the hole diameter is machined comprises an enlarged portion of the shaft and the portion of the hole diameter is machined through a position on the axial surface of the enlarged portion.

In some embodiments, the face of the shoulder of the enlarged portion of the shaft where the hole exits is machined (e.g., turned) at an angle that presents a surface normal to the axis of the key.

In some embodiments, the shaft into which a portion of the hole diameter is machined comprises a stepped terminus of the shaft and the portion of the hole diameter is machined through a position on the axial surface of the stepped terminus.

In some embodiments, the shaft into which a portion of the hole diameter is machined comprises a terminus of the shaft (e.g., of a shaft of uniform diameter) and the portion of the hole diameter is machined through a position on the axial surface of the terminus.

In some embodiments, prior to machining the hole, the machining (e.g., drill) location is spot-faced to present a flat surface for the machining of the hole.

In some embodiments, prior to machining the hole, the machining (e.g., drill) location is spot-faced to present a flat surface for the machining of the hole at a slant to the shaft axis.

In some embodiments, the hole is machined to extend through the length of the interface of the hub bore and the shaft (e.g., the axial surface of an enlarged portion or the axial surface of a stepped terminus of the shaft) (e.g., parallel to the shaft axis or at a slant relative to the shaft axis).

In some embodiments, the hole is machined to extend through about 10%, about 20%, about 30%, about 40%, about 50%, about 60%, about 70%, about 80%, or about 90% of the length of the interface of the hub bore and the shaft (e.g., the axial surface of an enlarged portion or the axial surface of a stepped terminus of the shaft) (e.g., parallel to the shaft axis or at a slant relative to the shaft axis).

In some embodiments, the hole is machined to extend through the length of the interface of the hub bore and the axial surface of a stepped terminus of the shaft (e.g., parallel to the shaft axis or at a slant relative to the shaft axis) and to further extend into the shaft that is not stepped.

In some embodiments, 1, 2, 3, 4, 5, 6, or more holes are machined, e.g., spaced (e.g., evenly spaced or not evenly spaced) at positions of the interface between the hub bore and the shaft (e.g., parallel to the shaft axis or at a slant relative to the shaft axis).

In some embodiments, a cylindrical hole is machined.

In some embodiments, the method further comprises having a key (e.g., a cylindrical key, e.g., a cylindrical clamping key or a cylindrical non-clamping key) inserted (e.g., pressed) (e.g., inserting (e.g., pressing)) into the hole. In some embodiments, the key is a cylindrical clamping key. In some embodiments, the key comprises a bolt. In some embodiments, the key comprises a stud. In some embodiments, the key comprises a screw (e.g., a shoulder screw). In some embodiments, the key is a cylindrical non-clamping key. In some embodiments, the cylindrical non-clamping key comprises a pin (e.g., a dowel pin, a clevis pin, a rod (e.g., a drill rod), a hollow cylinder (e.g., a tube or a pipe), or a spring pin (e.g., a split ring pin or coiled spring pin)). In some embodiments, a first terminus of the key protrudes from a first end of the hole. In some embodiments, first and second termini of the key protrude from first and second ends of the hole, respectively.

In some embodiments, the face of the shoulder of the enlarged portion of the shaft where the hole exits is machined (e.g., turned) at an angle that presents a surface normal to the axis of the key.

In some embodiments, the face of the hub shoulder where the hole starts is machined (e.g., turned) at an angle that presents a surface normal to the axis of the key.

In some embodiments, the method further comprises having a key (e.g., a cylindrical key, e.g., a cylindrical non-clamping key) inserted (e.g., pressed) (e.g., inserting (e.g., pressing)) into the hole and having an end restraint attached (e.g., attaching) on a terminus of the key (e.g., a terminus of a key that protrudes from a hole). In some embodiments, the end restraint comprises a head, a nut, a lock pin (e.g., an R-clip or a cotter pin), or a retaining ring (e.g., a snap ring). In some embodiments, e.g., wherein the shaft into which a portion of the hole diameter is machined comprises a stepped terminus of the shaft, the end restraint comprises a shaft washer (e.g., a plain washer that overlaps or covers the terminus of the key). In some embodiments, an end restraint is attached at a first terminus of the key (e.g., wherein a first terminus or first and second termini of the key protrude from a first end or first and second ends of the hole, respectively). In some embodiments, an end restraint is attached at each of first and second termini of the key (e.g., wherein first and second termini of the key protrude from first and second ends of the hole, respectively). In some embodiments, the key is a cylindrical non-clamping key. In some embodiments, the cylindrical non-clamping key comprises a pin (e.g., a dowel pin, a clevis pin, a rod (e.g., a drill rod), a hollow cylinder (e.g., a tube or a pipe), or a spring pin (e.g., a split ring pin or coiled spring pin)).

In some aspects, the disclosure is drawn to a method of precise indexing of a shaft and hubs (e.g., hubs of cams) with respect to each other and a cam follower(s) so as to obtain a desired operating sequence.

The method comprises having a hole machined (e.g., machining a hole) concurrently in the shaft and hub bore, wherein the hole is machined through the interface of the shaft and the hub bore (e.g., in a direction parallel to the shaft axis or at a slant relative to the shaft axis). A portion (e.g., about half) of the hole diameter is in the shaft and a portion (e.g., about half) of the hole diameter is in the hub. In some embodiments, the hole is parallel to the shaft axis. In some embodiments, the hole is at a slant relative to the shaft axis. In some embodiments, the hole is at a slant relative to the shaft axis and the slant is at an angle of about 5 to about 45 degrees (e.g., about 8 to about 15 degrees) relative to the shaft axis. In some embodiments, the hole is slanted relative to the shaft axis so that it starts, e.g., entirely or partially, in the hub shoulder and exits, e.g., entirely or partially, in the shoulder of the enlarged portion of the shaft.

In some embodiments, the machining comprises drilling.

In some embodiments, the machining comprises drilling and reaming.

In some embodiments, the shaft into which a portion of the hole diameter is machined comprises an enlarged portion of the shaft and the portion of the hole diameter is machined through a position on the axial surface of the enlarged portion.

In some embodiments, the face of the shoulder of the enlarged portion of the shaft where the hole exits is machined (e.g., turned) at an angle that presents a surface normal to the axis of the key.

In some embodiments, the shaft into which a portion of the hole diameter is machined comprises a stepped terminus of the shaft and the portion of the hole diameter is machined through a position on the axial surface of the stepped terminus.

In some embodiments, the shaft into which a portion of the hole diameter is machined comprises a terminus of the shaft (e.g., of a shaft of uniform diameter) and the portion of the hole diameter is machined through a position on the axial surface of the terminus.

In some embodiments, prior to machining the hole, the machining (e.g., drill) location is spot-faced to present a flat surface for the machining of the hole.

In some embodiments, prior to machining the hole, the machining (e.g., drill) location is spot-faced to present a flat surface for the machining of the hole at a slant to the shaft axis.

In some embodiments, the hole is machined to extend through the length of the interface of the hub bore and the shaft (e.g., the axial surface of an enlarged portion or the axial surface of a stepped terminus of the shaft) (e.g., parallel to the shaft axis or at a slant relative to the shaft axis).

In some embodiments, the hole is machined to extend through about 10%, about 20%, about 30%, about 40%, about 50%, about 60%, about 70%, about 80%, or about 90% of the length of the interface of the hub bore and the shaft (e.g., the axial surface of an enlarged portion or the axial surface of a stepped terminus of the shaft) (e.g., parallel to the shaft axis or at a slant relative to the shaft axis).

In some embodiments, the hole is machined to extend through the length of the interface of the hub bore and the axial surface of a stepped terminus of the shaft (e.g., parallel to the shaft axis or at a slant relative to the shaft axis) and to further extend into the shaft that is not stepped.

In some embodiments, 1, 2, 3, 4, 5, 6, or more holes are machined, e.g., spaced (e.g., evenly spaced or not evenly spaced) at positions of the interface between the hub bore and the shaft (e.g., parallel to the shaft axis or at a slant relative to the shaft axis).

In some embodiments, a cylindrical hole is machined.

In some embodiments, the method further comprises having a key (e.g., a cylindrical key, e.g., a cylindrical clamping key or a cylindrical non-clamping key) inserted (e.g., pressed) (e.g., inserting (e.g., pressing)) into the hole. In some embodiments, the key is a cylindrical clamping key. In some embodiments, the key comprises a bolt. In some embodiments, the key comprises a stud. In some embodiments, the key comprises a screw (e.g., a shoulder screw). In some embodiments, the key is a cylindrical non-clamping key. In some embodiments, the cylindrical non-clamping key comprises a pin (e.g., a dowel pin, a clevis pin, a rod (e.g., a drill rod), a hollow cylinder (e.g., a tube or a pipe), or a spring pin (e.g., a split ring pin or coiled spring pin)). In some embodiments, a first terminus of the key protrudes from a first end of the hole. In some embodiments, first and second termini of the key protrude from first and second ends of the hole, respectively.

In some embodiments, the face of the shoulder of the enlarged portion of the shaft where the hole exits is machined (e.g., turned) at an angle that presents a surface normal to the axis of the key.

In some embodiments, the face of the hub shoulder where the hole starts is machined (e.g., turned) at an angle that presents a surface normal to the axis of the key.

In some embodiments, the method further comprises having a key (e.g., a cylindrical key, e.g., a cylindrical non-clamping key) inserted (e.g., pressed) (e.g., inserting (e.g., pressing)) into the hole and having an end restraint attached (e.g., attaching) on a terminus of the key (e.g., a terminus of a key that protrudes from a hole). In some embodiments, the end restraint comprises a head, a nut, a lock pin (e.g., an R-clip or a cotter pin), or a retaining ring (e.g., a snap ring). In some embodiments, e.g., wherein the shaft into which a portion of the hole diameter is machined comprises a stepped terminus of the shaft, the end restraint comprises a shaft washer (e.g., a plain washer that overlaps or covers the terminus of the key). In some embodiments, an end restraint is attached at a first terminus of the key (e.g., wherein a first terminus or first and second termini of the key protrude from a first end or first and second ends of the hole, respectively). In some embodiments, an end restraint is attached at each of first and second termini of the key (e.g., wherein first and second termini of the key protrude from first and second ends of the hole, respectively). In some embodiments, the key is a cylindrical non-clamping key. In some embodiments, the cylindrical non-clamping key comprises a pin (e.g., a dowel pin, a clevis pin, a rod (e.g., a drill rod), a hollow cylinder (e.g., a tube or a pipe), or a spring pin (e.g., a split ring pin or coiled spring pin)).

In some aspects, the disclosure is drawn to a method of positioning and locking of a shaft and a hub.

The method comprises having a hole machined (e.g., machining a hole) concurrently in the shaft and hub bore, wherein the hole is machined through the interface of the shaft and the hub bore (e.g., in a direction parallel to the shaft axis or at a slant relative to the shaft axis); and having a key (e.g., a cylindrical key, e.g., a cylindrical clamping key or a cylindrical non-clamping key) inserted (e.g., pressed) (e.g., inserting (e.g., pressing)) into the hole. A portion (e.g., about half) of the hole diameter is in the shaft and a portion (e.g., about half) of the hole diameter is in the hub. In some embodiments, the hole is parallel to the shaft axis. In some embodiments, the hole is at a slant relative to the shaft axis. In some embodiments, the hole is at a slant relative to the shaft axis and the slant is at an angle of about 5 to about 45 degrees (e.g., about 8 to about 15 degrees) relative to the shaft axis. In some embodiments, the hole is slanted relative to the shaft axis so that it starts, e.g., entirely or partially, in the hub shoulder and exits, e.g., entirely or partially, in the shoulder of the enlarged portion of the shaft.

In some embodiments, the machining comprises drilling.

In some embodiments, the machining comprises drilling and reaming.

In some embodiments, the shaft into which a portion of the hole diameter is machined comprises an enlarged portion of the shaft and the portion of the hole diameter is machined through a position on the axial surface of the enlarged portion.

In some embodiments, the face of the shoulder of the enlarged portion of the shaft where the hole exits is machined (e.g., turned) at an angle that presents a surface normal to the axis of the key.

In some embodiments, the shaft into which a portion of the hole diameter is machined comprises a stepped terminus of the shaft and the portion of the hole diameter is machined through a position on the axial surface of the stepped terminus.

In some embodiments, the shaft into which a portion of the hole diameter is machined comprises a terminus of the shaft (e.g., of a shaft of uniform diameter) and the portion of the hole diameter is machined through a position on the axial surface of the terminus.

In some embodiments, prior to machining the hole, the machining (e.g., drill) location is spot-faced to present a flat surface for the machining of the hole.

In some embodiments, prior to machining the hole, the machining (e.g., drill) location is spot-faced to present a flat surface for the machining of the hole at a slant to the shaft axis.

In some embodiments, the hole is machined to extend through the length of the interface of the hub bore and the shaft (e.g., the axial surface of an enlarged portion or the axial surface of a stepped terminus of the shaft) (e.g., parallel to the shaft axis or at a slant relative to the shaft axis).

In some embodiments, the hole is machined to extend through about 10%, about 20%, about 30%, about 40%, about 50%, about 60%, about 70%, about 80%, or about 90% of the length of the interface of the hub bore and the shaft (e.g., the axial surface of an enlarged portion or the axial surface of a stepped terminus of the shaft) (e.g., parallel to the shaft axis or at a slant relative to the shaft axis).

In some embodiments, the hole is machined to extend through the length of the interface of the hub bore and the axial surface of a stepped terminus of the shaft (e.g., parallel to the shaft axis or at a slant relative to the shaft axis) and to further extend into the shaft that is not stepped.

In some embodiments, 1, 2, 3, 4, 5, 6, or more holes are machined, e.g., spaced (e.g., evenly spaced or not evenly spaced) at positions of the interface between the hub bore and the shaft (e.g., parallel to the shaft axis or at a slant relative to the shaft axis).

In some embodiments, a cylindrical hole is machined.

In some embodiments, the method further comprises having a key (e.g., a cylindrical key, e.g., a cylindrical clamping key or a cylindrical non-clamping key) inserted (e.g., pressed) (e.g., inserting (e.g., pressing)) into the hole. In some embodiments, the key is a cylindrical clamping key. In some embodiments, the key comprises a bolt. In some embodiments, the key comprises a stud. In some embodiments, the key comprises a screw (e.g., a shoulder screw). In some embodiments, the key is a cylindrical non-clamping key. In some embodiments, the cylindrical non-clamping key comprises a pin (e.g., a dowel pin, a clevis pin, a rod (e.g., a drill rod), a hollow cylinder (e.g., a tube or a pipe), or a spring pin (e.g., a split ring pin or coiled spring pin)). In some embodiments, a first terminus of the key protrudes from a first end of the hole. In some embodiments, first and second termini of the key protrude from first and second ends of the hole, respectively.

In some embodiments, the face of the shoulder of the enlarged portion of the shaft where the hole exits is machined (e.g., turned) at an angle that presents a surface normal to the axis of the key.

In some embodiments, the face of the hub shoulder where the hole starts is machined (e.g., turned) at an angle that presents a surface normal to the axis of the key.

In some embodiments, the method further comprises having a key (e.g., a cylindrical key, e.g., a cylindrical non-clamping key) inserted (e.g., pressed) (e.g., inserting (e.g., pressing)) into the hole and having an end restraint attached (e.g., attaching) on a terminus of the key (e.g., a terminus of a key that protrudes from a hole). In some embodiments, the end restraint comprises a head, a nut, a lock pin (e.g., an R-clip or a cotter pin), or a retaining ring (e.g., a snap ring). In some embodiments, e.g., wherein the shaft into which a portion of the hole diameter is machined comprises a stepped terminus of the shaft, the end restraint comprises a shaft washer (e.g., a plain washer that overlaps or covers the terminus of the key). In some embodiments, an end restraint is attached at a first terminus of the key (e.g., wherein a first terminus or first and second termini of the key protrude from a first end or first and second ends of the hole, respectively). In some embodiments, an end restraint is attached at each of first and second termini of the key (e.g., wherein first and second termini of the key protrude from first and second ends of the hole, respectively). In some embodiments, the key is a cylindrical non-clamping key. In some embodiments, the cylindrical non-clamping key comprises a pin (e.g., a dowel pin, a clevis pin, a rod (e.g., a drill rod), a hollow cylinder (e.g., a tube or a pipe), or a spring pin (e.g., a split ring pin or coiled spring pin)).

See, e.g., FIGS. 5A and 5B, 6A and 6B, and/or 7A and 7B.

In some embodiments, the method further comprises having a key (e.g., a cylindrical key, e.g., a cylindrical non-clamping key) inserted (e.g., pressed) (e.g., inserting (e.g., pressing)) into the hole and having a shaft coupling hub attached (e.g., seated) (e.g., attaching (e.g., seating)) on a terminus of the shaft. In some embodiments, a hub-to-hub connecting element (e.g., an internally-toothed barrel, a metallic grid, a composite disc, a roller chain, or an elastomeric spider) couples the assembly, e.g., to the shaft coupling hub of a drive motor, a gearbox, a brake wheel, or other component. In some embodiments, the connecting element couples the assembly to a shaft coupling hub.

In some aspects, the disclosure is drawn to a method of installing a hub on a shaft.

The method comprises having a hole machined (e.g., machining a hole) concurrently in the shaft and hub bore, wherein the hole is machined through the interface of the shaft and the hub bore (e.g., in a direction parallel to the shaft axis or at a slant relative to the shaft axis). A portion (e.g., about half) of the hole diameter is in the shaft and a portion (e.g., about half) of the hole diameter is in the hub. In some embodiments, the hole is parallel to the shaft axis. In some embodiments, the hole is at a slant relative to the shaft axis. In some embodiments, the hole is at a slant relative to the shaft axis and the slant is at an angle of about 5 to about 45 degrees (e.g., about 8 to about 15 degrees) relative to the shaft axis. In some embodiments, the hole is slanted relative to the shaft axis so that it starts, e.g., entirely or partially, in the hub shoulder and exits, e.g., entirely or partially, in the shoulder of the enlarged portion of the shaft.

In some embodiments, the machining comprises drilling.

In some embodiments, the machining comprises drilling and reaming.

In some embodiments, the shaft into which a portion of the hole diameter is machined comprises an enlarged portion of the shaft and the portion of the hole diameter is machined through a position on the axial surface of the enlarged portion.

In some embodiments, the face of the shoulder of the enlarged portion of the shaft where the hole exits is machined (e.g., turned) at an angle that presents a surface normal to the axis of the key.

In some embodiments, the shaft into which a portion of the hole diameter is machined comprises a stepped terminus of the shaft and the portion of the hole diameter is machined through a position on the axial surface of the stepped terminus.

In some embodiments, the shaft into which a portion of the hole diameter is machined comprises a terminus of the shaft (e.g., of a shaft of uniform diameter) and the portion of the hole diameter is machined through a position on the axial surface of the terminus.

In some embodiments, prior to machining the hole, the machining (e.g., drill) location is spot-faced to present a flat surface for the machining of the hole.

In some embodiments, prior to machining the hole, the machining (e.g., drill) location is spot-faced to present a flat surface for the machining of the hole at a slant to the shaft axis.

In some embodiments, the hole is machined to extend through the length of the interface of the hub bore and the shaft (e.g., the axial surface of an enlarged portion or the axial surface of a stepped terminus of the shaft) (e.g., parallel to the shaft axis or at a slant relative to the shaft axis).

In some embodiments, the hole is machined to extend through about 10%, about 20%, about 30%, about 40%, about 50%, about 60%, about 70%, about 80%, or about 90% of the length of the interface of the hub bore and the shaft (e.g., the axial surface of an enlarged portion or the axial surface of a stepped terminus of the shaft) (e.g., parallel to the shaft axis or at a slant relative to the shaft axis).

In some embodiments, the hole is machined to extend through the length of the interface of the hub bore and the axial surface of a stepped terminus of the shaft (e.g., parallel to the shaft axis or at a slant relative to the shaft axis) and to further extend into the shaft that is not stepped.

In some embodiments, 1, 2, 3, 4, 5, 6, or more holes are machined, e.g., spaced (e.g., evenly spaced or not evenly spaced) at positions of the interface between the hub bore and the shaft (e.g., parallel to the shaft axis or at a slant relative to the shaft axis).

In some embodiments, a cylindrical hole is machined.

In some embodiments, the method further comprises having a key (e.g., a cylindrical key, e.g., a cylindrical clamping key or a cylindrical non-clamping key) inserted (e.g., pressed) (e.g., inserting (e.g., pressing)) into the hole. In some embodiments, the key is a cylindrical clamping key. In some embodiments, the key comprises a bolt. In some embodiments, the key comprises a stud. In some embodiments, the key comprises a screw (e.g., a shoulder screw). In some embodiments, the key is a cylindrical non-clamping key. In some embodiments, the cylindrical non-clamping key comprises a pin (e.g., a dowel pin, a clevis pin, a rod (e.g., a drill rod), a hollow cylinder (e.g., a tube or a pipe), or a spring pin (e.g., a split ring pin or coiled spring pin)). In some embodiments, a first terminus of the key protrudes from a first end of the hole. In some embodiments, first and second termini of the key protrude from first and second ends of the hole, respectively.

In some embodiments, the face of the shoulder of the enlarged portion of the shaft where the hole exits is machined (e.g., turned) at an angle that presents a surface normal to the axis of the key.

In some embodiments, the face of the hub shoulder where the hole starts is machined (e.g., turned) at an angle that presents a surface normal to the axis of the key.

In some embodiments, the method further comprises having a key (e.g., a cylindrical key, e.g., a cylindrical non-clamping key) inserted (e.g., pressed) (e.g., inserting (e.g., pressing)) into the hole and having an end restraint attached (e.g., attaching) on a terminus of the key (e.g., a terminus of a key that protrudes from a hole). In some embodiments, the end restraint comprises a head, a lock pin (e.g., an R-clip or a cotter pin), or a retaining ring (e.g., a snap ring). In some embodiments, e.g., wherein the shaft into which a portion of the hole diameter is machined comprises a stepped terminus of the shaft, the end restraint comprises a shaft washer (e.g., a plain washer that overlaps or covers the terminus of the key). In some embodiments, an end restraint is attached at a first terminus of the key (e.g., wherein a first terminus or first and second termini of the key protrude from a first end or first and second ends of the hole, respectively). In some embodiments, an end restraint is attached at each of first and second termini of the key (e.g., wherein first and second termini of the key protrude from first and second ends of the hole, respectively). In some embodiments, the key is a cylindrical non-clamping key. In some embodiments, the cylindrical non-clamping key comprises a pin (e.g., a dowel pin, a clevis pin, a rod (e.g., a drill rod), a hollow cylinder (e.g., a tube or a pipe), or a spring pin (e.g., a split ring pin or coiled spring pin)).

In some embodiments, the method further comprises having a key (e.g., a cylindrical key, e.g., a cylindrical non-clamping key) inserted (e.g., pressed) (e.g., inserting (e.g., pressing)) into the hole and having a shaft coupling hub attached (e.g., seated) (e.g., attaching (e.g., seating)) on a terminus of the shaft. In some embodiments, a hub-to-hub connecting element (e.g., an internally-toothed barrel, a metallic grid, a composite disc, a roller chain, or an elastomeric spider) couples the assembly, e.g., to the shaft coupling hub of a drive motor, a gearbox, a brake wheel, or other component. In some embodiments, the connecting element couples the assembly to a shaft coupling hub.

In some aspects, the disclosure is drawn to a method of repositioning (e.g., rotationally repositioning) a hub on a shaft.

The method comprises obtaining a hub that was positioned on a shaft, e.g., wherein a first hole was present at the interface of the shaft and the hub bore (e.g., parallel to the shaft axis or at a slant relative to the shaft axis) (e.g., wherein a first hole had been machined through the interface of the shaft and the hub bore (e.g., optionally wherein a first key had been inserted in the first hole)); abandoning the first hole; rotationally repositioning the hub on the shaft; and having a second hole machined (e.g., machining a second hole) concurrently in the shaft and hub bore, wherein the second hole is machined through the interface of the shaft and the hub bore (e.g., in a direction parallel to the shaft axis or at a slant relative to the shaft axis). A portion (e.g., about half) of the second hole diameter is in the shaft and a portion (e.g., about half) of the second hole diameter is in the hub. As used herein, abandoning the first hole refers to a key being removed from the first hole.

In some embodiments, the repositioning results in minimal (e.g., about 5%, about 10%, about 15%, about 20%, about 25%, about 30%, about 35%, or about 40%) reduction in strength of either the shaft or the hub, as compared to the strength of the shaft or the hub (respectively) prior to having the second hole machined.

In some embodiments, the hole is parallel to the shaft axis. In some embodiments, the hole is at a slant relative to the shaft axis. In some embodiments, the hole is at a slant relative to the shaft axis and the slant is at an angle of about 5 to about 45 degrees (e.g., about 8 to about 15 degrees) relative to the shaft axis. In some embodiments, the hole is slanted relative to the shaft axis so that it starts, e.g., entirely or partially, in the hub shoulder and exits, e.g., entirely or partially, in the shoulder of the enlarged portion of the shaft. In some embodiments, the machining comprises drilling.

In some embodiments, the machining comprises drilling and reaming.

In some embodiments, the shaft into which a portion of the second hole is machined comprises an enlarged portion of the shaft and the portion of the second hole is machined through a position on the axial surface of the enlarged portion.

In some embodiments, the face of the shoulder of the enlarged portion of the shaft where the hole exits is machined (e.g., turned) at an angle that presents a surface normal to the axis of the key.

In some embodiments, the shaft into which a portion of the second hole is machined comprises a stepped terminus of the shaft and the portion of the second hole is machined through a position on the axial surface of the stepped terminus.

In some embodiments, the shaft into which a portion of the second hole is machined comprises a terminus of the shaft (e.g., of a shaft of uniform diameter) and the portion of the second hole is machined through a position on the axial surface of the terminus.

In some embodiments, prior to machining the hole, the machining (e.g., drill) location is spot-faced to present a flat surface for the machining of the hole.

In some embodiments, prior to machining the hole, the machining (e.g., drill) location is spot-faced to present a flat surface for the machining of the hole at a slant to the shaft axis.

In some embodiments, the second hole is machined to extend through the length of the interface of the hub bore and the shaft (e.g., the axial surface of an enlarged portion or the axial surface of a stepped terminus of the shaft) (e.g., parallel to the shaft axis or at a slant relative to the shaft axis).

In some embodiments, the second hole is machined to extend through about 10%, about 20%, about 30%, about 40%, about 50%, about 60%, about 70%, about 80%, or about 90% of the length of the interface of the hub bore and the shaft (e.g., the axial surface of an enlarged portion or the axial surface of a stepped terminus of the shaft) (e.g., parallel to the shaft axis or at a slant relative to the shaft axis).

In some embodiments, the second hole is machined to extend through the length of the interface of the hub bore and the axial surface of a stepped terminus of the shaft (e.g., parallel to the shaft axis or at a slant relative to the shaft axis) and to further extend into the shaft that is not stepped.

In some embodiments, 1, 2, 3, 4, 5, 6, or more second holes are machined, e.g., spaced (e.g., evenly spaced or not evenly spaced) at positions of the interface between the hub bore and the shaft (e.g., parallel to the shaft axis or at a slant relative to the shaft axis).

In some embodiments, a cylindrical second hole is machined.

In some embodiments, the method further comprises having a key (e.g., a cylindrical key, e.g., a cylindrical clamping key or a cylindrical non-clamping key) inserted (e.g., pressed) (e.g., inserting (e.g., pressing)) into the second hole. In some embodiments, the key is a cylindrical clamping key. In some embodiments, the key comprises a bolt. In some embodiments, the key comprises a stud. In some embodiments, the key comprises a screw (e.g., a shoulder screw). In some embodiments, the key is a cylindrical non-clamping key. In some embodiments, the cylindrical non-clamping key comprises a pin (e.g., a dowel pin, a clevis pin, a rod (e.g., a drill rod), a hollow cylinder (e.g., a tube or a pipe), or a spring pin (e.g., a split ring pin or coiled spring pin)). In some embodiments, a first terminus of the key protrudes from a first end of the second hole. In some embodiments, first and second termini of the key protrude from first and second ends of the second hole, respectively.

In some embodiments, the face of the shoulder of the enlarged portion of the shaft where the hole exits is machined (e.g., turned) at an angle that presents a surface normal to the axis of the key.

In some embodiments, the face of the hub shoulder where the hole starts is machined (e.g., turned) at an angle that presents a surface normal to the axis of the key.

In some embodiments, the method further comprises having a key (e.g., a cylindrical key, e.g., a cylindrical non-clamping key) inserted (e.g., pressed) (e.g., inserting (e.g., pressing)) into the second hole and having an end restraint attached (e.g., attaching) on a terminus of the key (e.g., a terminus of a key that protrudes from a second hole). In some embodiments, the end restraint comprises a head, a lock pin (e.g., an R-clip or a cotter pin), or a retaining ring (e.g., a snap ring). In some embodiments, e.g., wherein the shaft into which a portion of the hole diameter is machined comprises a stepped terminus of the shaft, the end restraint comprises a shaft washer (e.g., a plain washer that overlaps or covers the terminus of the key). In some embodiments, an end restraint is attached at a first terminus of the key (e.g., wherein a first terminus or first and second termini of the key protrude from a first end or first and second ends of the second hole, respectively). In some embodiments, an end restraint is attached at each of first and second termini of the key (e.g., wherein first and second termini of the key protrude from first and second ends of the second hole, respectively). In some embodiments, the key is a cylindrical non-clamping key. In some embodiments, the cylindrical non-clamping key comprises a pin (e.g., a dowel pin, a clevis pin, a rod (e.g., a drill rod), a hollow cylinder (e.g., a tube or a pipe), or a spring pin (e.g., a split ring pin or coiled spring pin)).

In some embodiments, the method further comprises having a key (e.g., a cylindrical key, e.g., a cylindrical clamping key or a cylindrical non-clamping key) inserted (e.g., pressed) (e.g., inserting (e.g., pressing)) into the second hole and having a hub of a shaft coupling assembly (e.g., a flexible, semi-flexible, or rigid shaft coupling assembly) attached (e.g., seated) (e.g., attaching (e.g., seating)) on a terminus of the hub. A mating assembly component can be connected to the hub of the shaft coupling assembly and to an end restraint (if present). In some embodiments, the assembly comprises a flexible or semi-flexible shaft coupling with a hub-to-hub connecting element (e.g., internally gear-toothed barrel, metallic grid, composite disc, roller chain, or elastomeric spider) that couples the assembly, e.g., to a shaft coupling hub of a drive motor, gearbox, or other component). In some embodiments, the hub-to-hub connecting element couples the assembly to a shaft coupling hub. In some embodiments, the assembly further comprises a shaft coupling hub (e.g., a rigid or flanged coupling hub) wherein a mating flange of a drive motor, gearbox, brake wheel, or other component is connected to it.

In some aspects, the disclosure is drawn to a method of transmitting torque, the methods comprising use of a shaft or an assembly described herein.

In some embodiments, the method is used to transmit torque in a wheel (e.g., a brake wheel or a sprocket wheel), a gearbox (e.g., a speed reducer, a speed increaser, or a differential), a gear (e.g., a spur, a helical gear, a bevel gear, or paired opposite-hand helical gears thereof), a shaft coupling, a crank, a cam (or adjacent cams), power train, or a pulley.

In some embodiments, the torque transmission is drive torque transmission.

In some embodiments, the torque transmission is braking torque transmission.

In some aspects, the disclosure provides a method of obtaining precise interlocking of a hub and a shaft by use of a key (e.g., cylindrical key, e.g., cylindrical clamping key or cylindrical non-clamping key). As used herein, precise refers to metal-to-metal fit or contact over the entire cylindrical surface of the key. The method ensures metal-to-metal contact (interference fits) between the key (e.g., cylindrical key, e.g., cylindrical clamping key or cylindrical non-clamping key), shaft, and hub.

On shafts with an enlarged portion, capacity to resist the axial load, due to the helix angle of a helical gear or the separating force between bevel gears, is determined by the strength of the clamping key in tension in either direction (as in FIGS. 2A and 2B); or by the strength of a hub bore lip in the hub bore and the enlarged portion on the shaft (as in FIGS. 3A and 3B) in one direction and the strength of the clamping key assembly in tension in the other direction.

On shafts with a reduced terminus, capacity to resist the axial load in one direction, due to the helix angle of a helical gear or the separating force between bevel gears, is determined by the bearing strength of step 64 and the hub shoulder (as in FIGS. 6A and 6B) or step 74 and the hub shoulder (as in FIGS. 7A and 7B). In both arrangements, the capacity to resist axial loads in the other direction is only that due to friction of the hub-shaft press fits.

In some aspects, the disclosure provides a method of obtaining precise interlocking of a hub and a shaft by use of a key, e.g., a cylindrical key, e.g., a cylindrical clamping or non-clamping key for bi-directional or uni-directional transmission of rotary motion. The method, e.g., as described herein, ensures metal-to-metal contact (interference fits) between the cylindrical key, shaft, and hub. If there is no axial load applied, the clamping feature will serve to ensure positive retention of the keys.

In some aspects, the disclosure provides a method of installing a hub on a shaft by use of one or more keys, (e.g., a cylindrical key, (e.g., a cylindrical clamping key or a cylindrical non-clamping key)), each with metal-to-metal contact (interference fit). The method utilizes a method and/or assembly described herein. The hub can be indexed to the precise position on the shaft before the key installation is made. The number of keys that can be installed is limited only by the axial surface of the local shaft portion.

In some aspects, the disclosure provides a method of precise indexing of more than one hub (e.g., of cams) (e.g., two hubs (e.g., paired opposite-hand helical gears)) with respect to each other. The method utilizes a method and/or assembly described herein. After the hubs are pressed onto the shaft and indexed, holes are drilled and reamed through the shaft and both hubs to receive the cylindrical clamping keys. See, e.g., FIGS. 4A and 4B.

In some aspects, the disclosure provides a method of installing a hub on a shaft with the capability of easily repositioning the hub (after the initial installation) with little reduction in the strength of either the hub or the shaft. The method comprises a method and/or assembly described herein. In this case the original holes are abandoned and new holes are drilled and reamed for the cylindrical clamping keys.

In some aspects, the disclosure provides a method of locking a hub on a shaft against axial movement when the sides (e.g., sides of the hub and the enlarged portion of the shaft normal to the axis of the shaft) are in the same plane on one end but out of plane on the other end. The hub is locked to the shaft by use of a cylindrical clamping key head or nut (with a plain washer if required/desired) on one end and a load-equalizing washer (e.g., rectangular, square, or a round V-washer) or other load-equalizing component (e.g., saddle or rocker) installed under the head or nut on the other end. For example, with reference to FIGS. 2A and 2B, when the right ends of the hub and the enlarged portion of the shaft are in the same plane and in contact with the cylindrical clamping key and the left ends of the hub and the enlarged portion of the shaft are not in the same plane, the hub can be locked in that position by installing a load-equalizing washer, or other load-equalizing component on that end and tightening a nut (on a bolt or a shoulder screw) or both nuts on a stud. Such axial positioning and locking can be applied with any cylindrical clamping key (e.g., as in FIGS. 2A and 2B, FIGS. 3A and 3B, or FIGS. 4A and 4B). In the case of FIGS. 3A and 3B, the lip on the right end of the hub rests on the right side of the enlarged portion of the shaft and determines the axial position of the hub. The method comprises a method and/or assembly described herein.

In some aspects, the disclosure provides a method of locking hubs on shafts when hubs are not subjected to axial loads (e.g., spur gears, cams, etc.) by use of cylindrical non-clamping keys. See, e.g., FIGS. 5A and 5B. The method comprises a method and/or assembly described herein.

In some aspects, the disclosure provides a method of locking hubs to exposed ends shafts when hubs are not subjected to axial loads but it is required/desired to ensure axial movement of the hub or cylindrical non-clamping keys is restrained or limited. See, e.g., FIGS. 6A and 6B. The method comprises a method and/or assembly described herein.

In some aspects, the disclosure provides a method of locking a hub to a concealed end of a shaft when the hub is not subjected to axial loads. The method comprises a method and/or assembly described herein. See, e.g., FIGS. 7A and 7B. If it is required/desired to ensure that axial movement of the hub or cylindrical non-clamping keys is restrained or limited, a large washer can be attached (by a screw) to the shaft to press on the keys.

All publications, patent applications, patents, and other references mentioned herein are incorporated by reference in their entirety. In the case of conflict, the present specification, including definitions, controls. In addition, the materials, methods, and examples are illustrative only and not intended to be limiting.

Having now described several aspects of at least one embodiment, it is apparent that various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only, and the scope of the disclosure should be determined from proper construction of the appended claims, and their equivalents.

What is claimed is:

1. An assembly comprising:
   a shaft including an enlarged diameter shaft portion having an outer surface and end portions each having a flat surface;
   two hubs that are separate from the shaft and mounted on the enlarged diameter shaft portion, the two hubs being configured so that outer ends of the two hubs are spaced apart from each other, each hub including an inner surface configured to engage the outer surface of the enlarged diameter shaft portion with a light interference fit and end portions each having a flat surface that lies along a common plane with the flat surface of a respective end portion of the enlarged diameter shaft portion, wherein the two hubs each include an opposite-hand helical gear that is indexed/meshed for load sharing with a mating herringbone pinion; and
   a first fastening device positioned within a first opening formed in the engaged outer surface of the shaft and the inner surfaces of the two hubs and extending from respective co-planar flat surfaces at the end portions of the enlarged diameter shaft portion and the two hubs along lengths of the shaft and the two hubs, wherein the first fastening device includes a bolt head and a nut bearing on the end surfaces of the hubs and the enlarged diameter shaft portion.

2. The assembly of claim 1, further comprising a second fastening device positioned within a second opening formed in the engaged outer surface of the shaft and the inner surface of the hub along lengths of the shaft and the hubs.

3. The assembly of claim 2, wherein the first fastening device and the second fastening device include bolts having diameters selected for a desired transmitted torque capacity based on their material strength and the strength of the shaft and hub.

4. The assembly of claim 1, wherein the first opening is formed by a semi-cylindrical formation formed in the outer surface of the shaft and a mating semi-cylindrical formation formed in the inner surface of the hub.

* * * * *